(12) United States Patent
Dalli et al.

(10) Patent No.: US 11,715,007 B2
(45) Date of Patent: Aug. 1, 2023

(54) BEHAVIOUR MODELING, VERIFICATION, AND AUTONOMOUS ACTIONS AND TRIGGERS OF ML AND AI SYSTEMS

(71) Applicant: UMNAI Limited, Ta' Xbiex (MT)

(72) Inventors: Angelo Dalli, Floriana (MT); Matthew Grech, San Gwann (MT); Mauro Pirrone, Kalkara (MT)

(73) Assignee: UMNAI Limited, Ta'Xbiex (MT)

( * ) Notice: Subject to any disclaimer, the term of this patent is extended or adjusted under 35 U.S.C. 154(b) by 0 days.

(21) Appl. No.: 17/459,091

(22) Filed: Aug. 27, 2021

(65) Prior Publication Data
US 2022/0067520 A1 Mar. 3, 2022

Related U.S. Application Data

(60) Provisional application No. 63/071,664, filed on Aug. 28, 2020.

(51) Int. Cl.
*G06N 3/08* (2023.01)
*G06N 20/00* (2019.01)
(Continued)

(52) U.S. Cl.
CPC ............. *G06N 3/08* (2013.01); *G06F 18/214* (2023.01); *G06F 18/217* (2023.01);
(Continued)

(58) Field of Classification Search
CPC .......... G06N 3/08; G06N 7/005; G06N 20/00; G06K 9/6256; G06K 9/6261; G06K 9/6262
See application file for complete search history.

(56) References Cited

U.S. PATENT DOCUMENTS

2003/0014692 A1* 1/2003 James ................ G06F 11/2263
714/25
2006/0259197 A1* 11/2006 Boe ...................... G05B 13/042
700/44
(Continued)

OTHER PUBLICATIONS

DeepXplore: Automated Whitebox Testing of Deep Learning Systems Pei et al. (Year: 2017).*
(Continued)

*Primary Examiner* — Brian M Smith
*Assistant Examiner* — Ababacar Seck
(74) *Attorney, Agent, or Firm* — Maier & Maier, PLLC

(57) ABSTRACT

An exemplary embodiment may present a behavior modeling architecture that is intended to assist in handling, modelling, predicting and verifying the behavior of machine learning models to assure the safety of such systems meets the required specifications and adapt such architecture according to the execution sequences of the behavioral model. An embodiment may enable conditions in a behavioral model to be integrated in the execution sequence of behavioral modeling in order to monitor the probability likelihoods of certain paths in a system. An embodiment allows for real-time monitoring during training and prediction of machine learning models. Conditions may also be utilized to trigger system-knowledge injection in a whitebox model in order to maintain the behavior of a system within defined boundaries. An embodiment further enables additional formal verification constraints to be set on the output or internal parts of white-box models.

26 Claims, 18 Drawing Sheets

Behaviour boundaries and model prediction

(51) Int. Cl.
*G06F 18/214* (2023.01)
*G06F 18/21* (2023.01)
*G06N 7/01* (2023.01)

(52) U.S. Cl.
CPC ........... *G06F 18/2163* (2023.01); *G06N 7/01* (2023.01); *G06N 20/00* (2019.01)

(56) References Cited

U.S. PATENT DOCUMENTS

| | | | | |
|---|---|---|---|---|
| 2010/0070439 | A1* | 3/2010 | Takeuchi | G06N 20/00 706/12 |
| 2015/0026027 | A1* | 1/2015 | Priess | G06Q 20/4016 705/35 |
| 2017/0213150 | A1* | 7/2017 | Arel | G06N 3/0427 |
| 2019/0050574 | A1* | 2/2019 | Abraham | H04L 63/1433 |
| 2019/0050575 | A1* | 2/2019 | Abraham | G06F 21/604 |
| 2019/0130312 | A1* | 5/2019 | Xiong | G06N 3/0481 |
| 2019/0258460 | A1* | 8/2019 | Schlachter | G06F 8/35 |
| 2019/0260786 | A1* | 8/2019 | Dunn | G06F 21/556 |
| 2019/0286153 | A1* | 9/2019 | Rankawat | G06V 20/58 |
| 2019/0308589 | A1* | 10/2019 | Maluf | H04L 12/2803 |
| 2019/0354853 | A1* | 11/2019 | Zoldi | G06N 3/08 |
| 2019/0370647 | A1* | 12/2019 | Doshi | G06N 3/08 |
| 2020/0021620 | A1* | 1/2020 | Purathepparambil | H04L 63/102 |
| 2020/0111100 | A1* | 4/2020 | Adjaoute | G06N 20/00 |
| 2020/0111578 | A1* | 4/2020 | Koblick | G16H 20/10 |
| 2020/0302094 | A1* | 9/2020 | Greenwood | G06N 3/126 |
| 2020/0320435 | A1* | 10/2020 | Sequeira | G06N 3/006 |
| 2020/0342026 | A1* | 10/2020 | Boyer | G06F 16/29 |
| 2020/0402084 | A1* | 12/2020 | Briancon | G06F 8/315 |
| 2021/0056412 | A1* | 2/2021 | Jung | G06N 3/0445 |
| 2021/0133610 | A1* | 5/2021 | Natesan Ramamurthy | G06N 20/00 |
| 2021/0140290 | A1* | 5/2021 | Eslinger | F04D 15/0088 |
| 2021/0357767 | A1* | 11/2021 | Fuerst | G06K 9/6288 |

OTHER PUBLICATIONS

Explainable Neural Networks based on Additive Index Models Vaughan et al., (Year: 2018).*
ExplAIner: A Visual Analytics Framework for Interactive and Explainable Machine Learning Spinner et al. (Year: 2019).*
Explainable Artificial Intelligence (XAI): Concepts, taxonomies, opportunities and challenges toward responsible AI Arrieta et al. (Year: 2019).*
Integration of Black-Box and White-Box Modeling Approaches for Software Reliability Estimation Mohan et al. (Year: 2010).*
A Survey of Methods for Explaining Black Box Models Guidotti et al. (Year: 2018).*
DSD—Dense-Sparse-Dense Training for Deep Neural Networks Han et al. (Year: 2017).*
Neuro-Symbolic Execution: Augmenting Symbolic Execution with Neural Constraints Shiqi et al. (Year: 2019).*

* cited by examiner

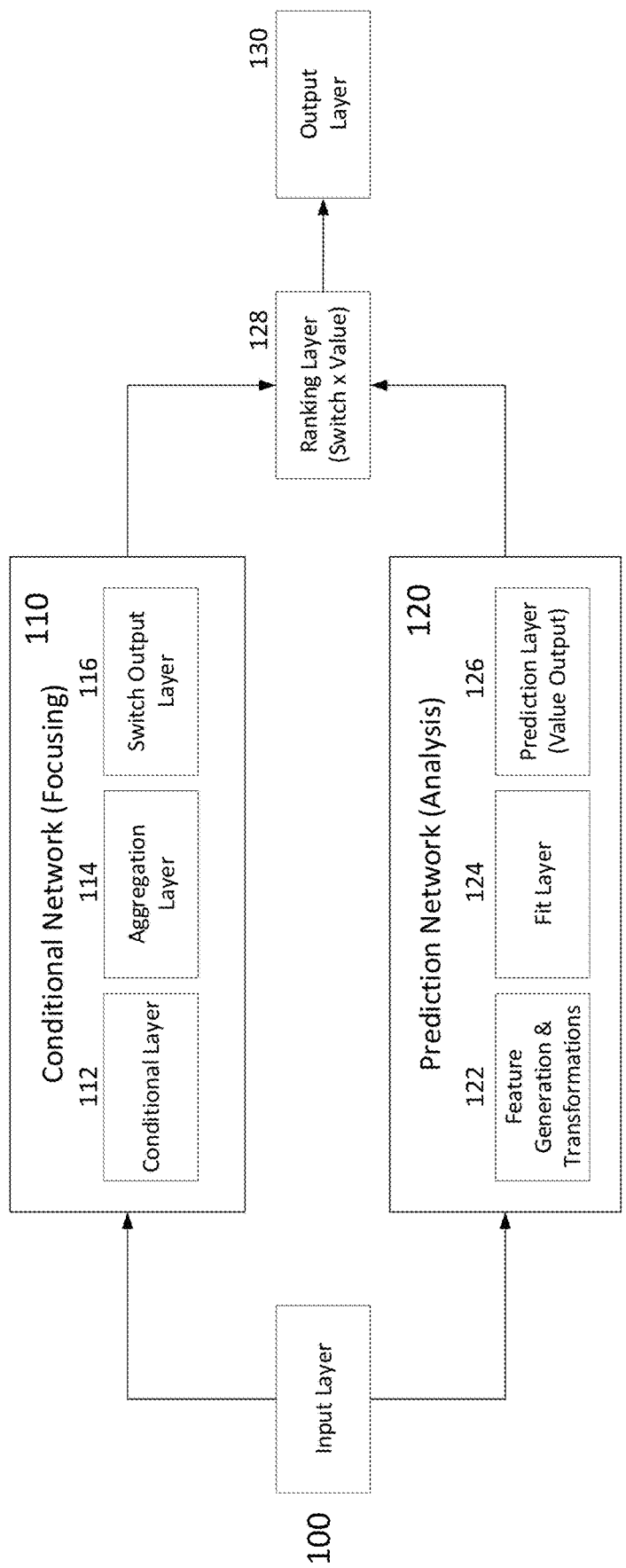
Figure 1 – High-Level XNN Architecture

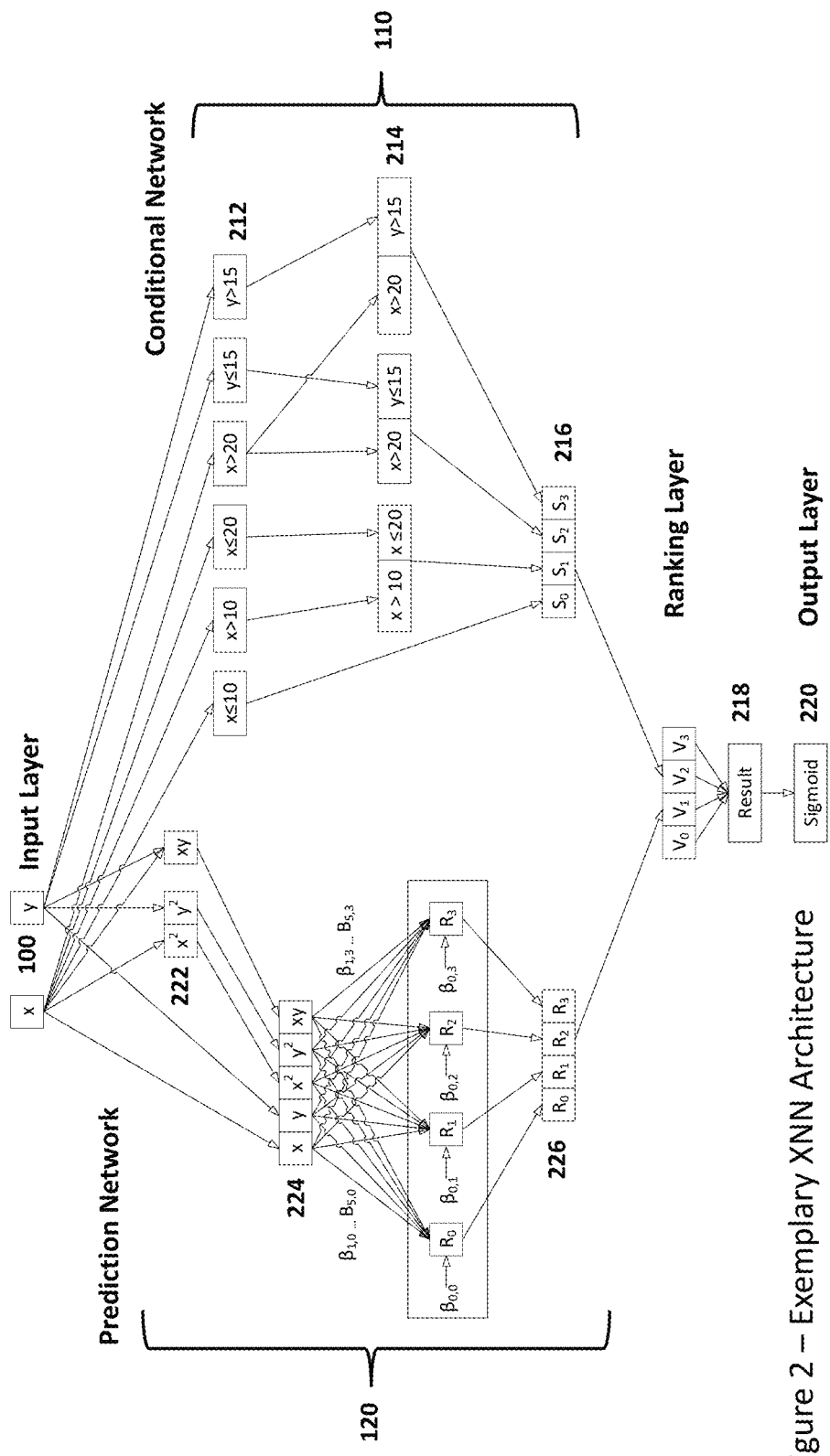
Figure 2 – Exemplary XNN Architecture

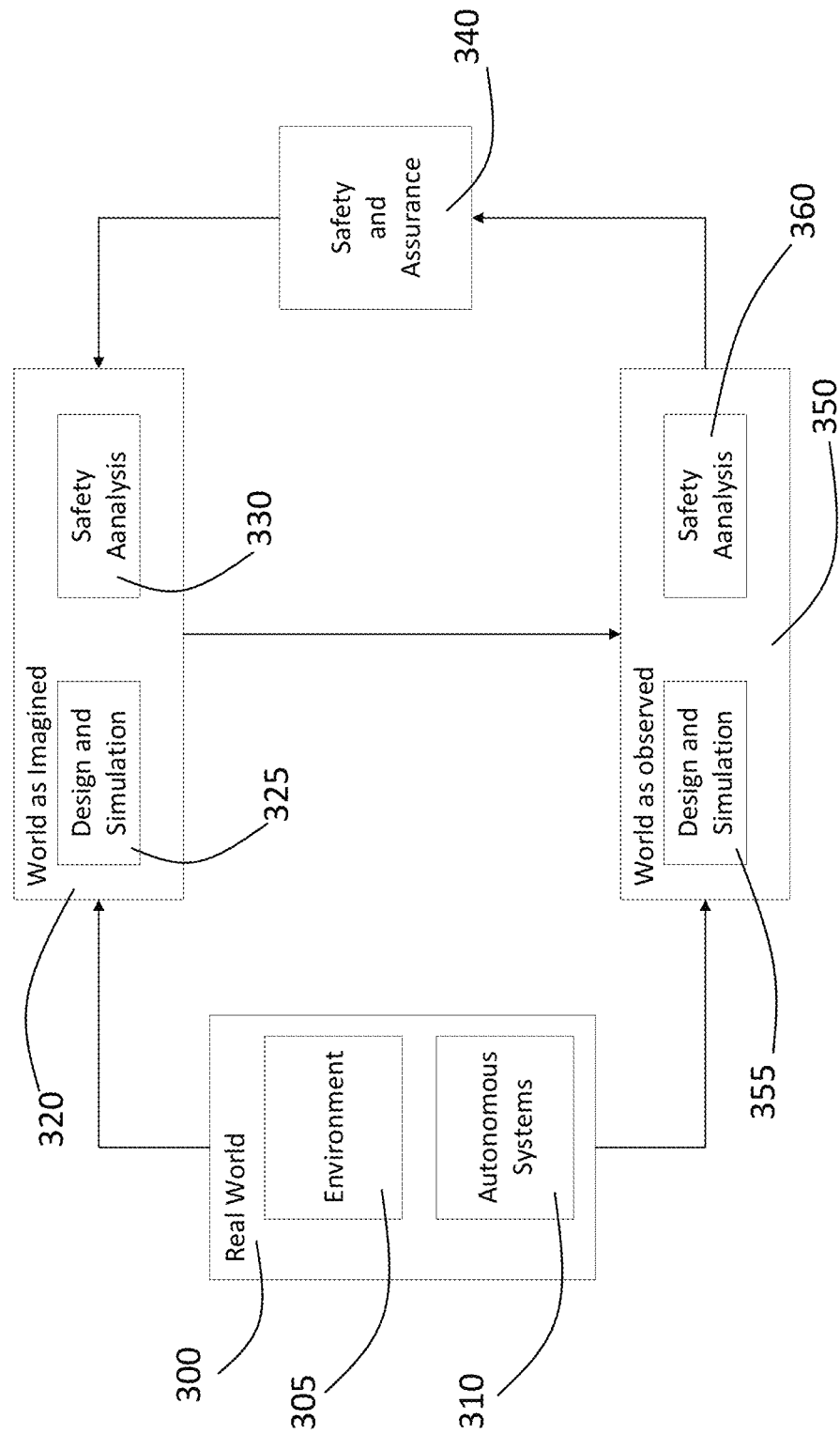
Figure 3: Safety Assurance Framework (McDermid et al., 2019) [PRIOR ART]

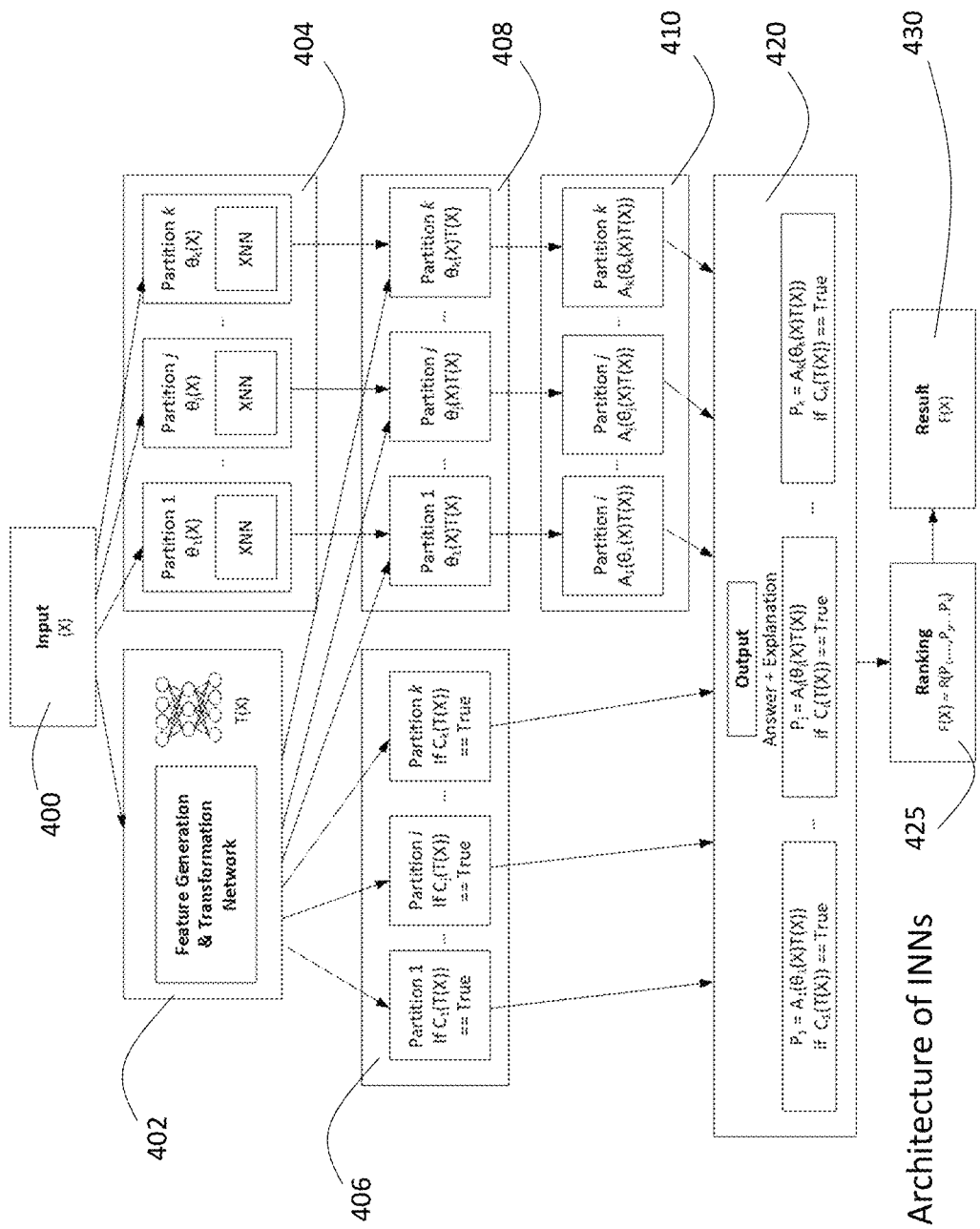
Figure 4 – General Architecture of INNs

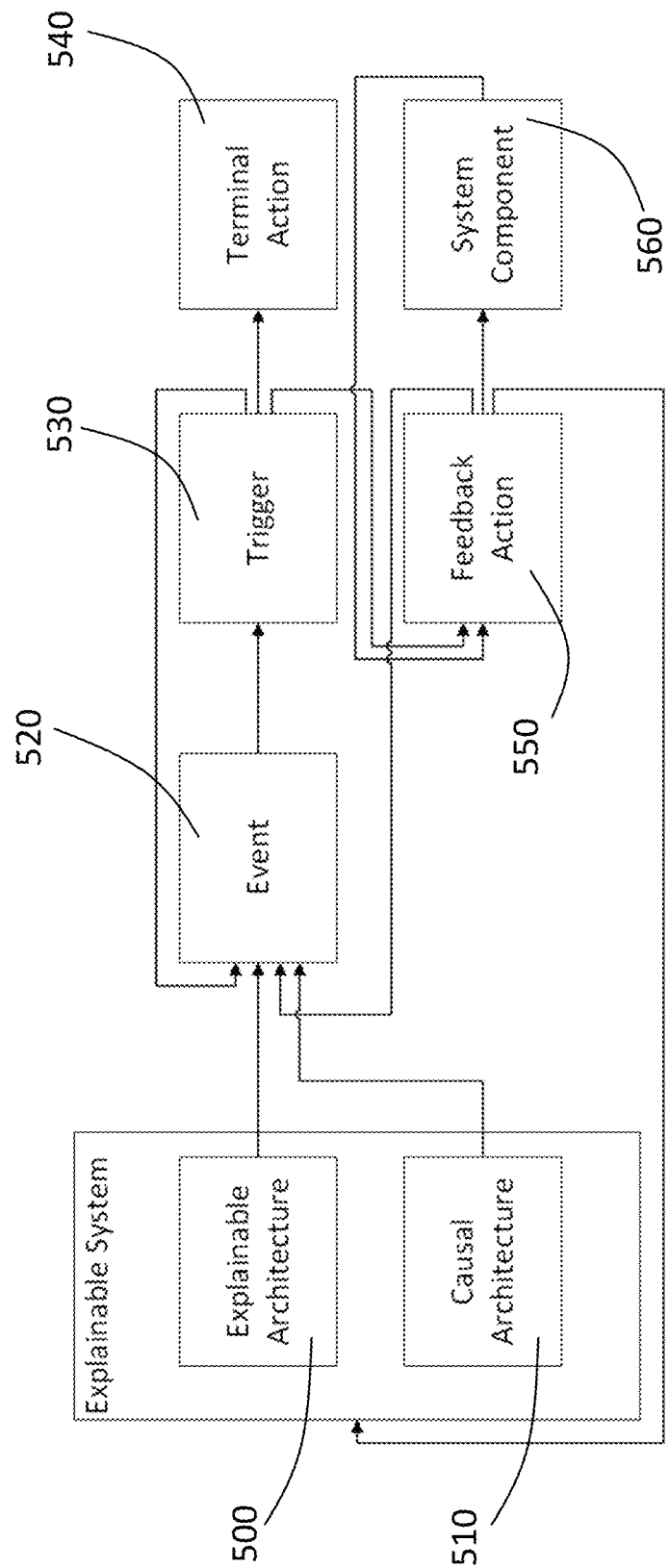
Figure 5: Proposed architecture for behavioural modelling in ML-based Systems

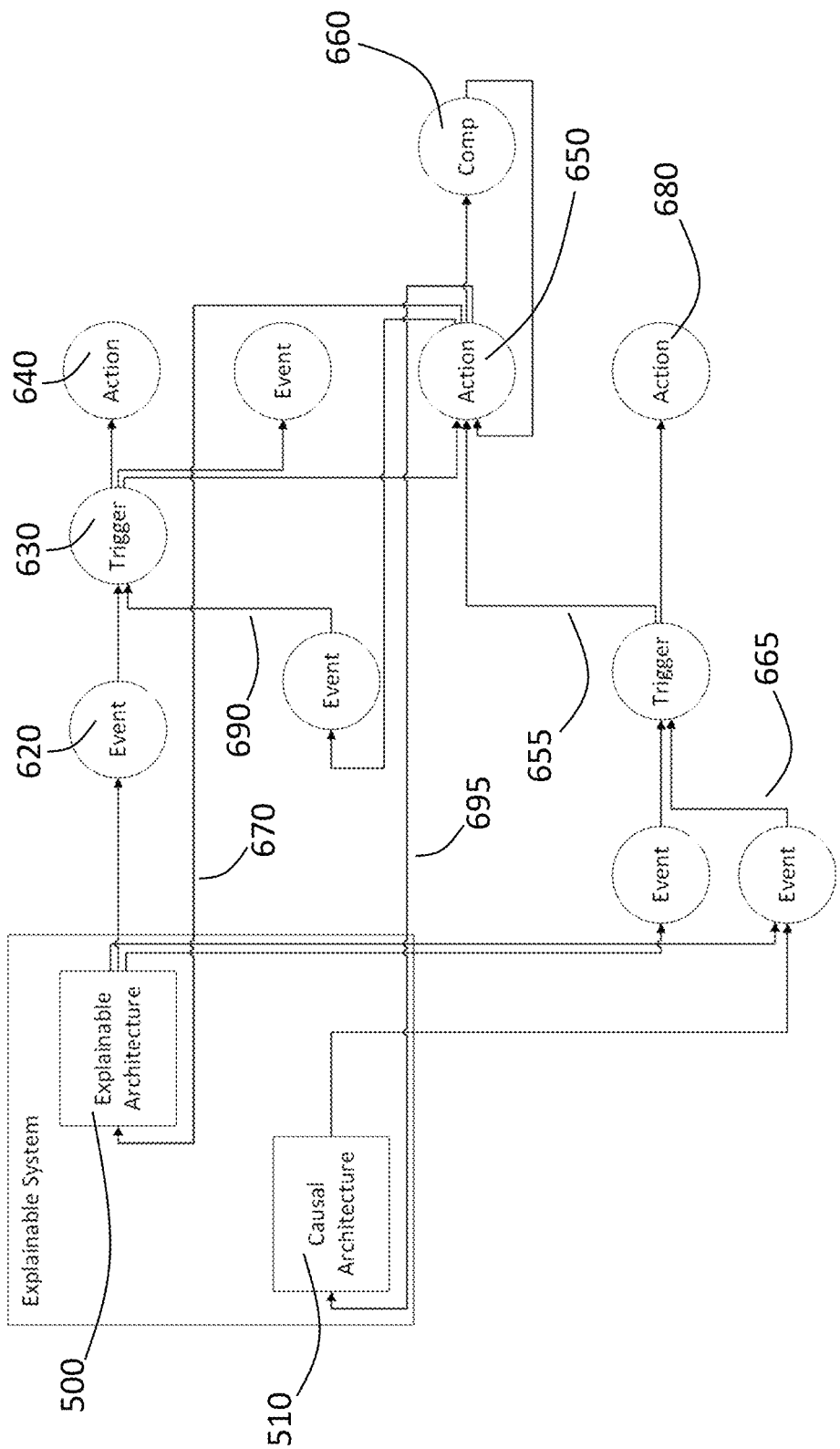
Figure 6: Explainable behavioural model framework

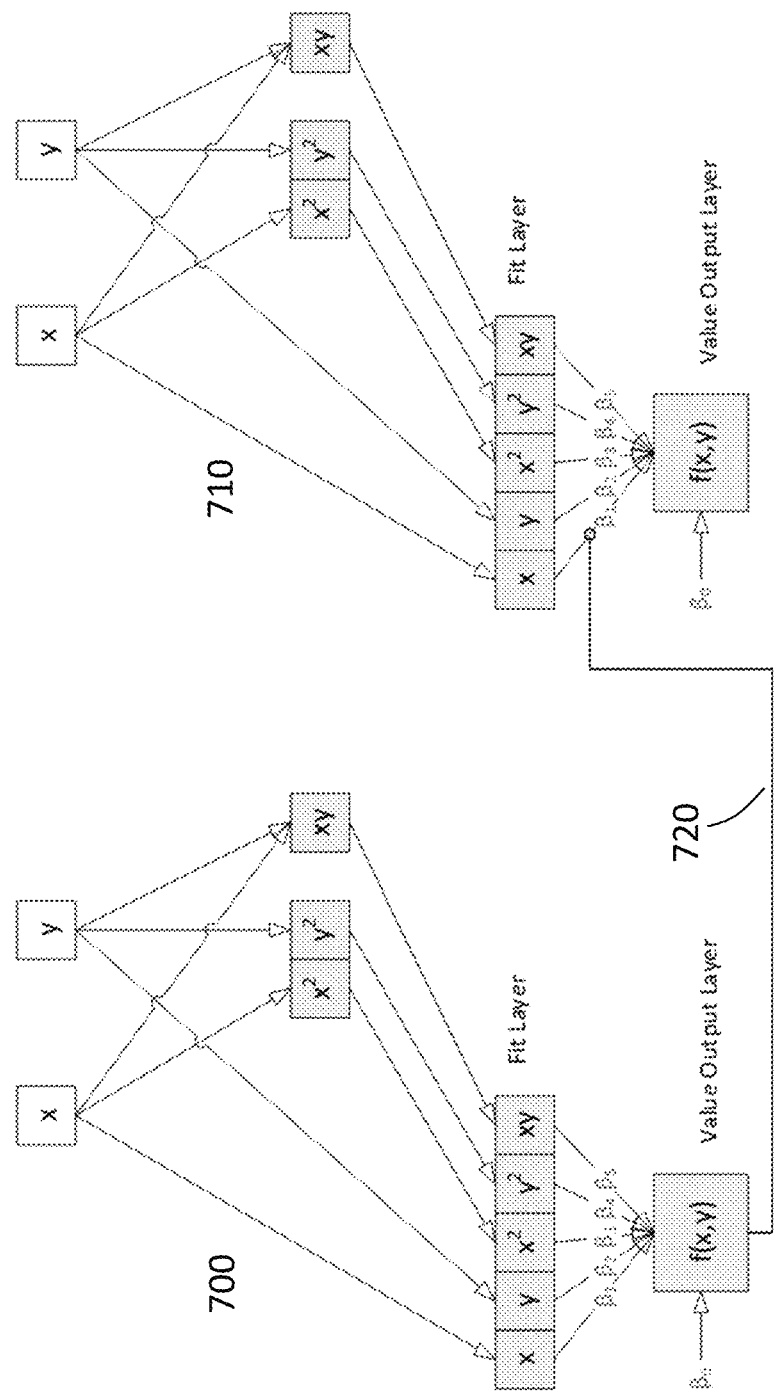
Figure 7 – Fast partial XNN architecture

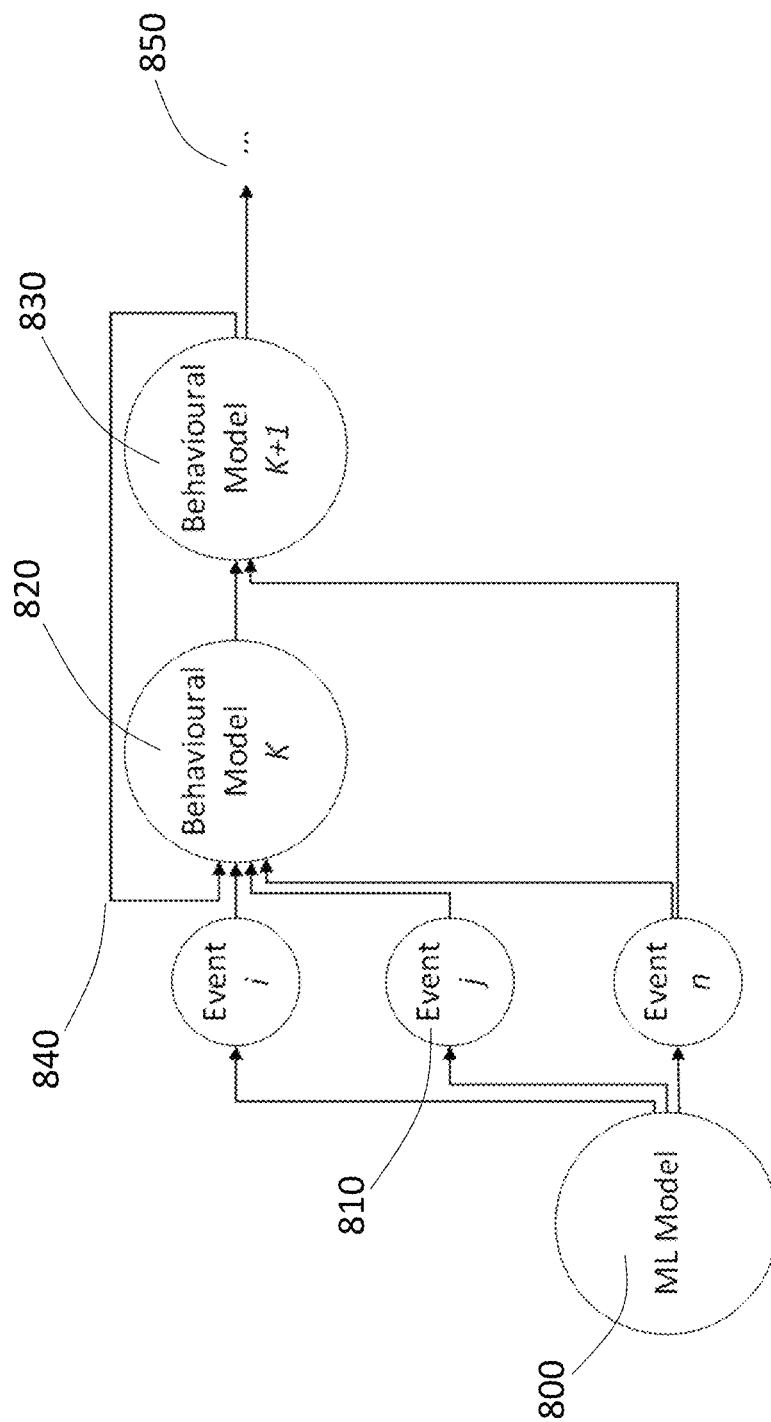
Figure 8: Behavioural Model Hierarchy (BMH)

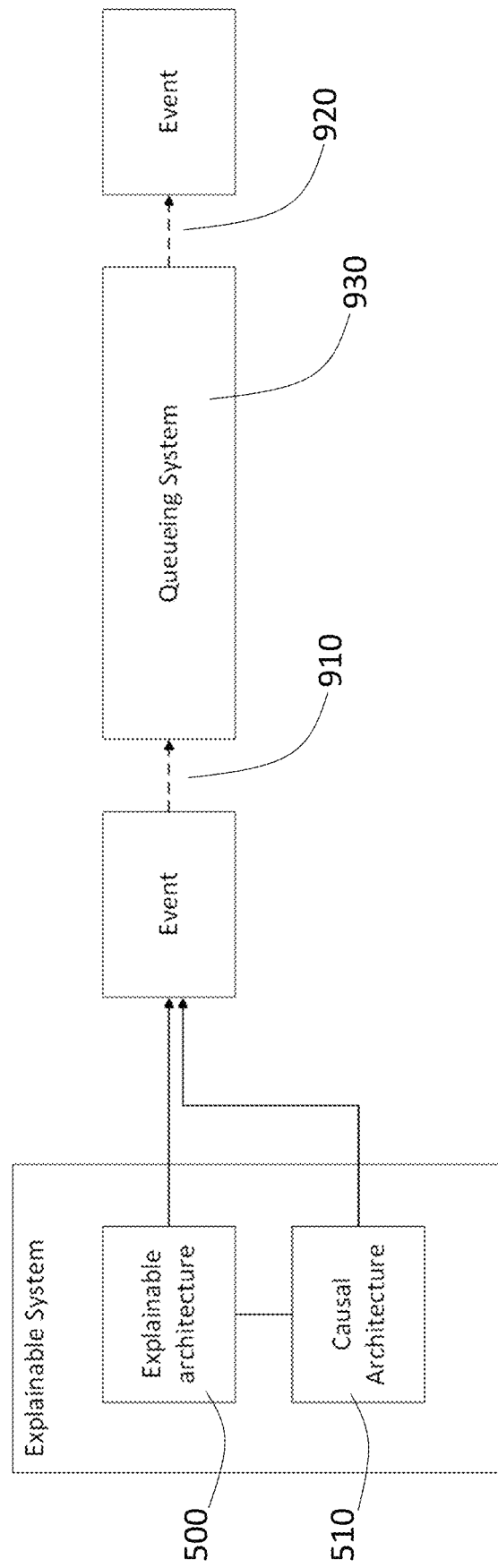
Figure 9: Event queueing system

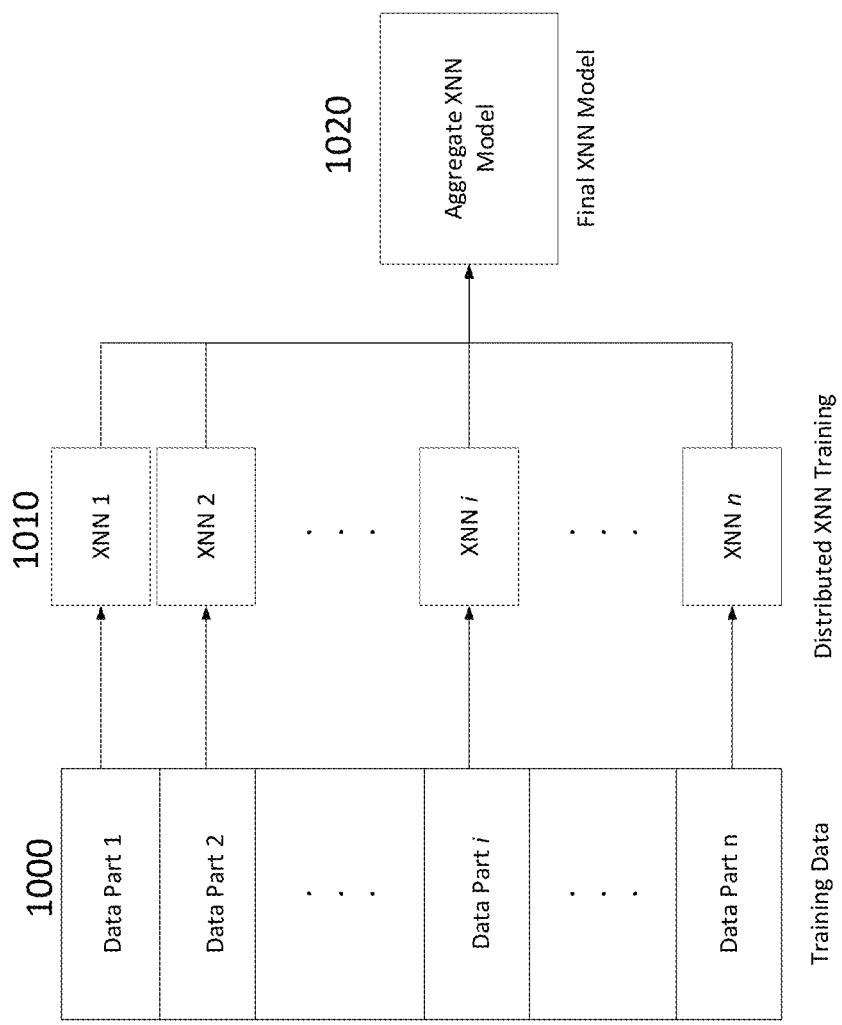
Figure 10 – High Level Architecture of a Distributed XNN Training System

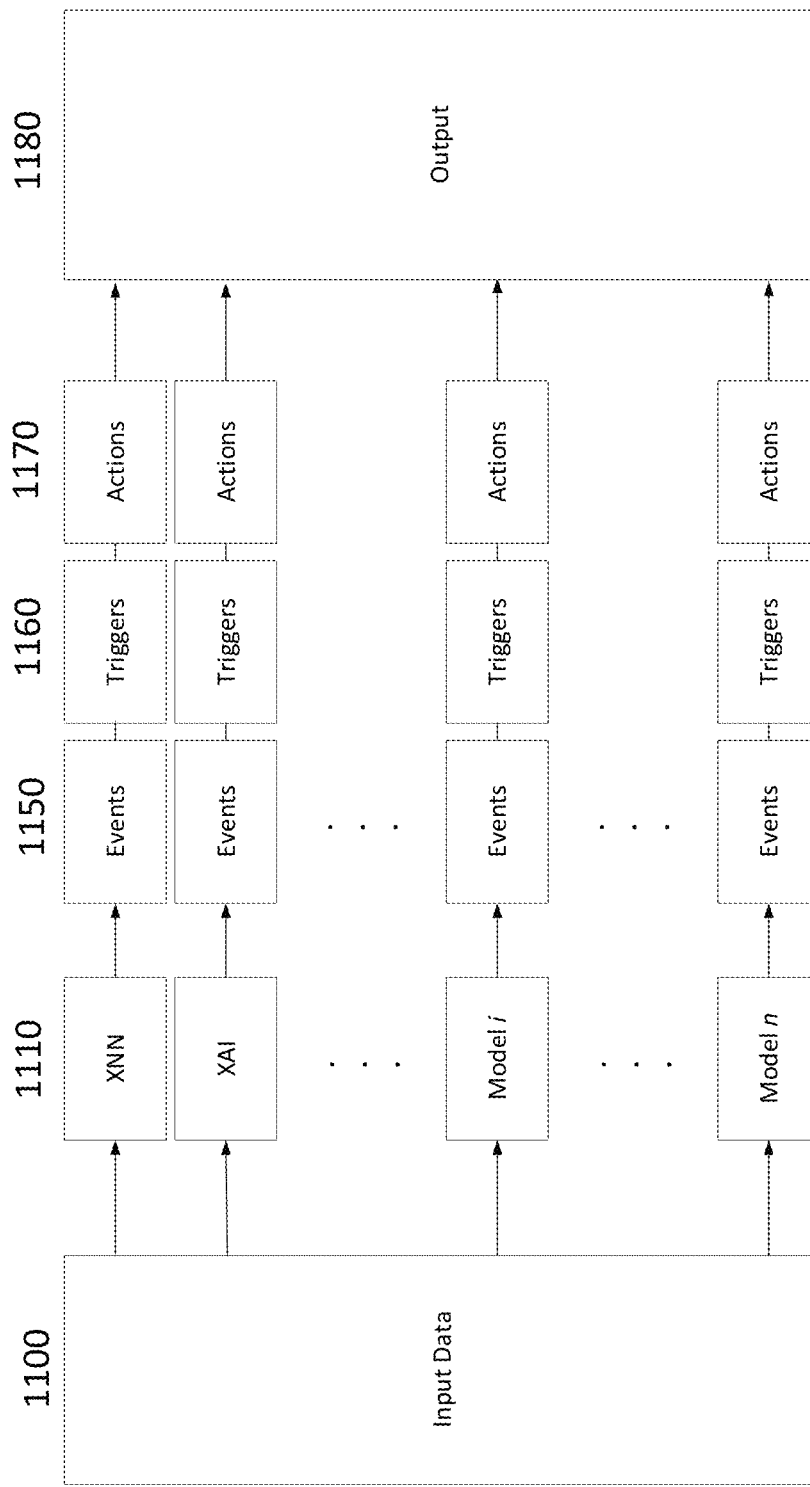
Figure 11 – Feed-Forward Distributed Architecture for Events, Triggers and Actions

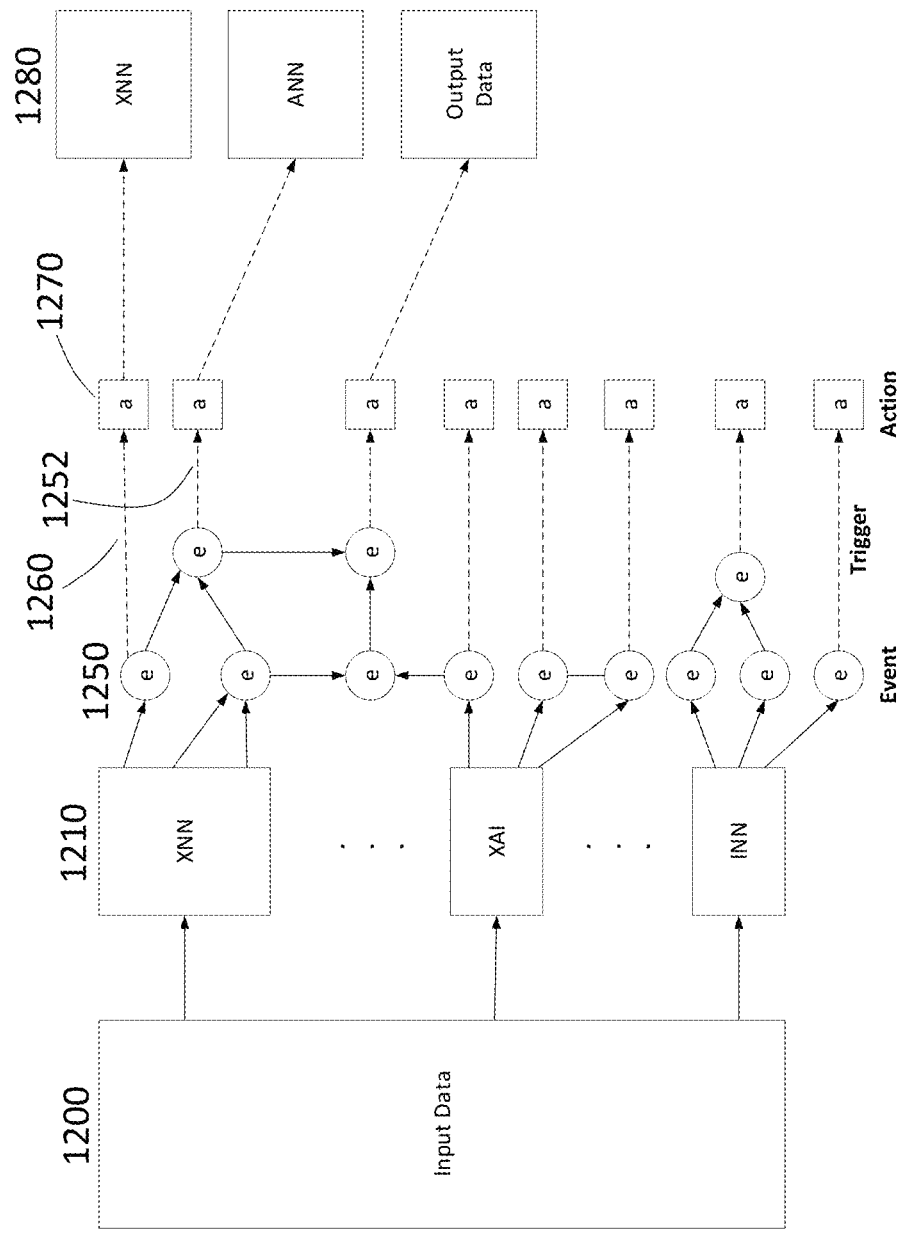
Figure 12 – Feed-Forward Distributed Architecture for Events, Triggers and Actions

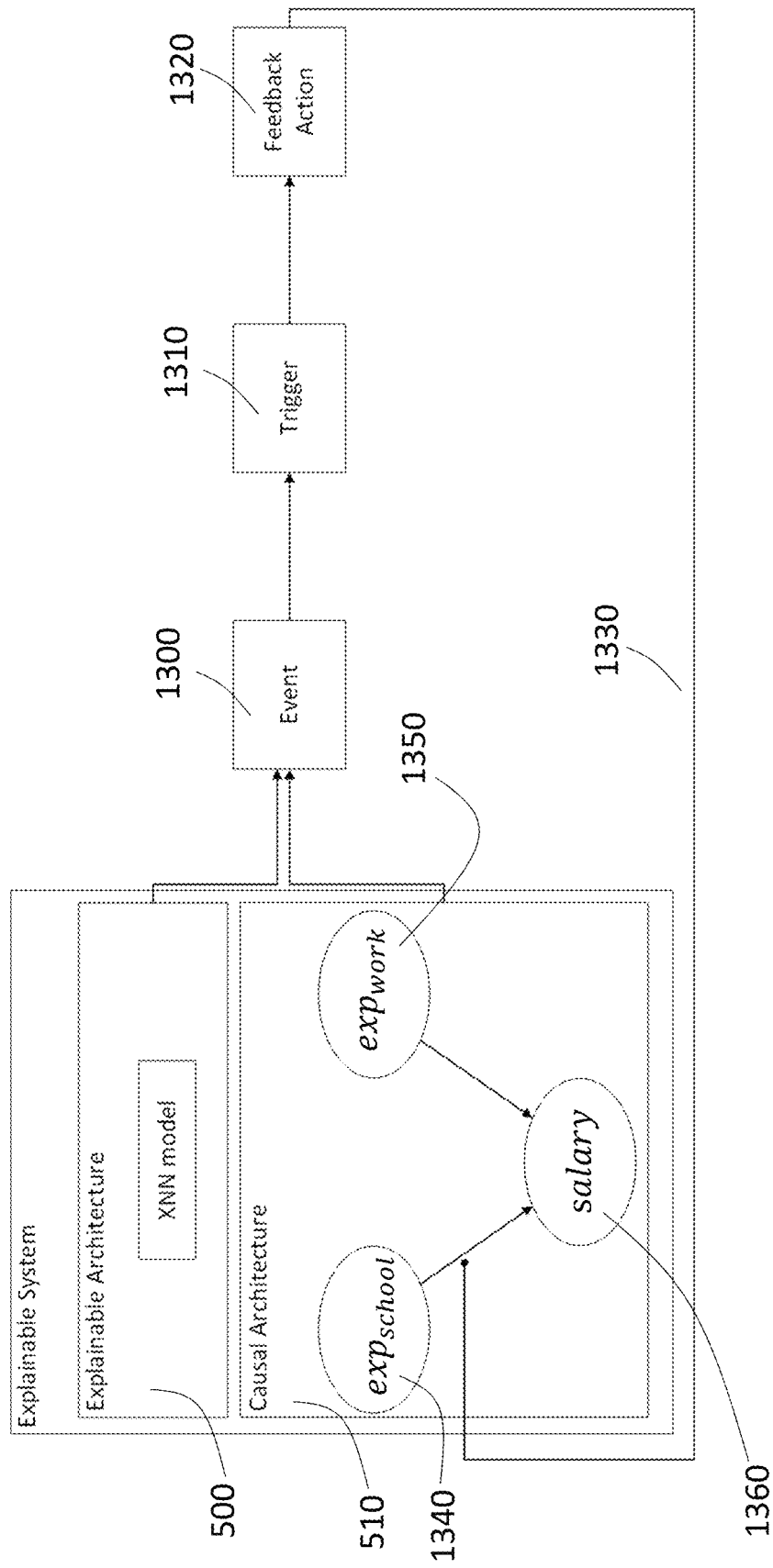
Figure 13 – Graphical model of a Structural Causal Model integrated in a Behavioral Model

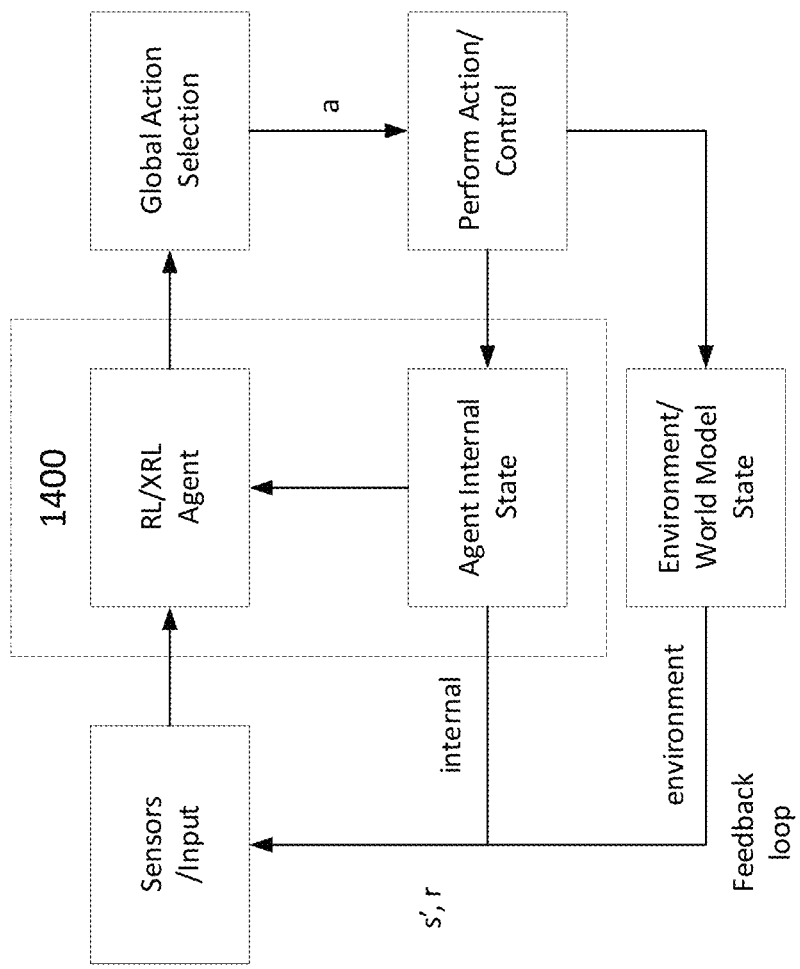
Figure 14 – RL Agent FSM/Markov Process

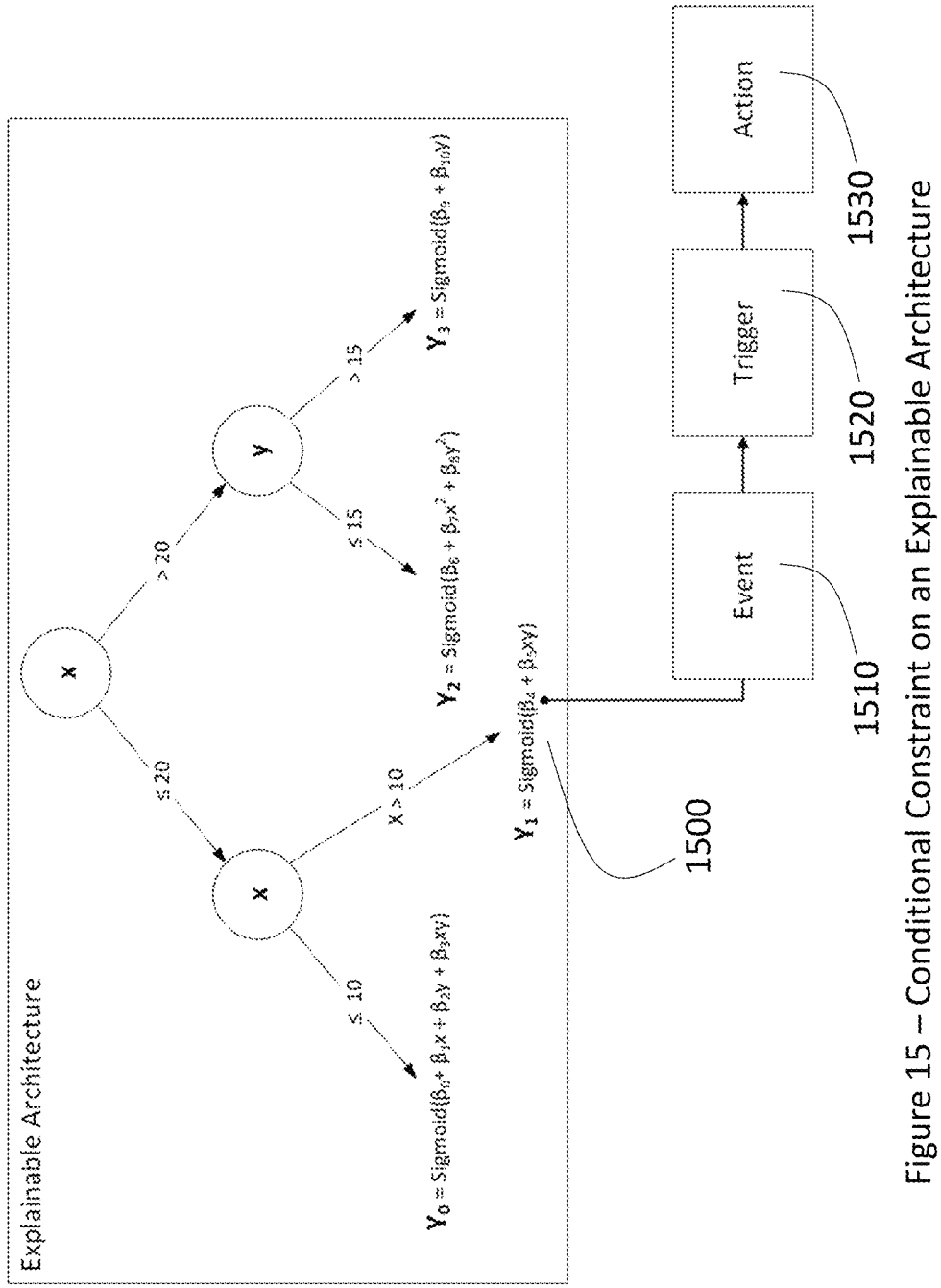
Figure 15 – Conditional Constraint on an Explainable Architecture

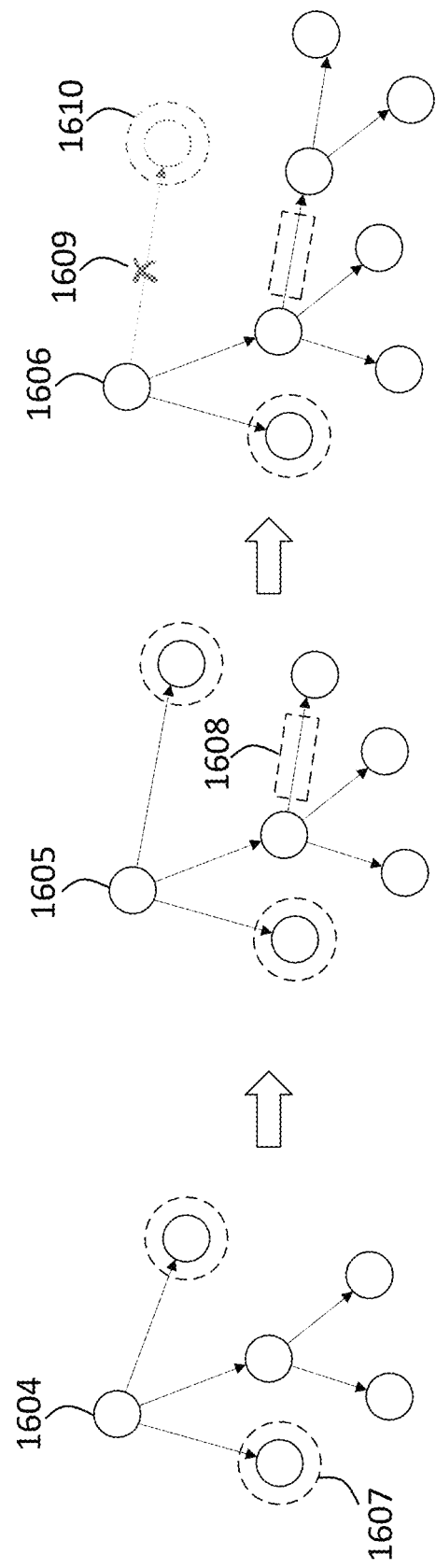
Figure 16 – Visualized Evolution of Labelled Partitions

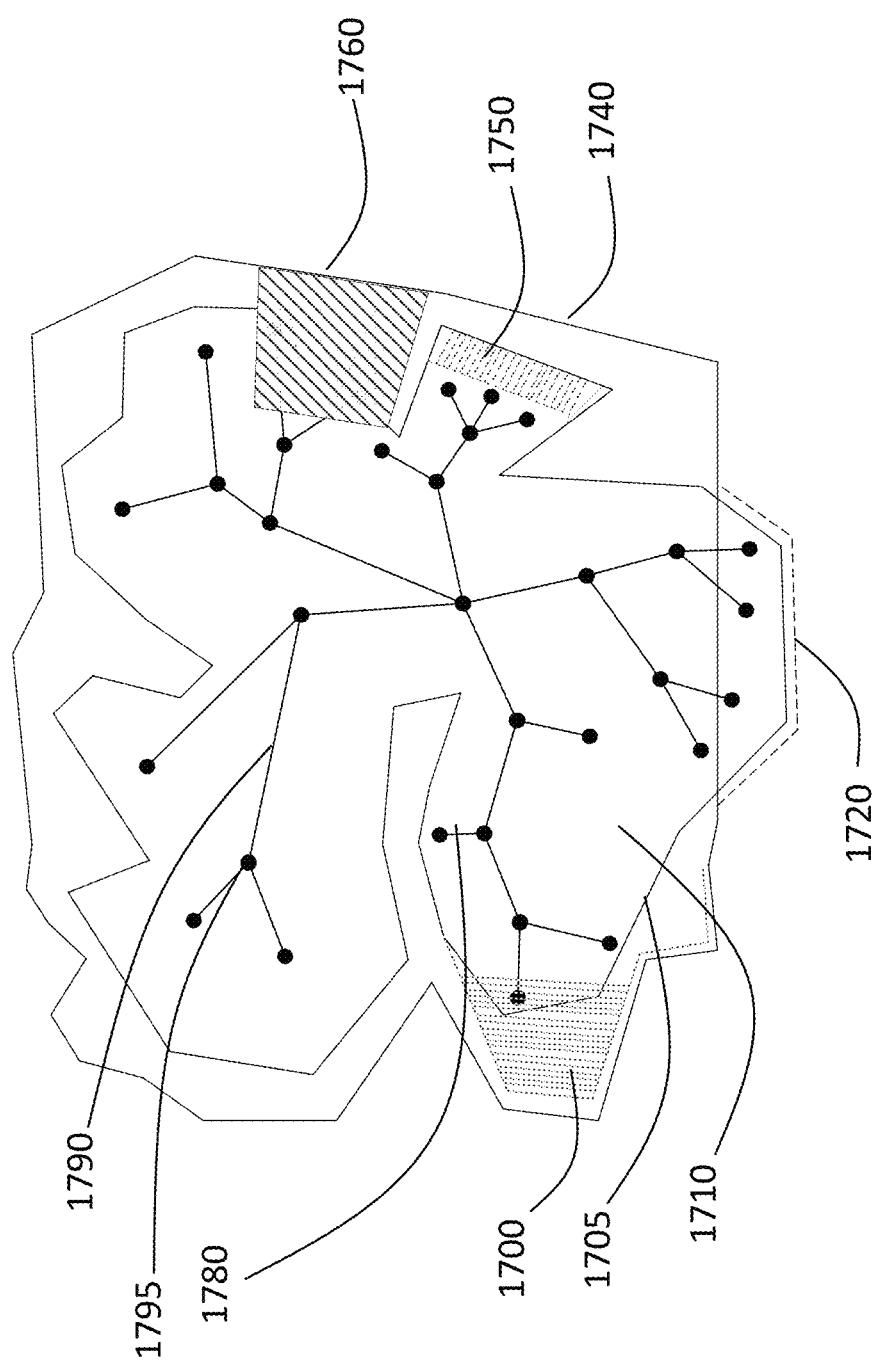
Figure 17 – Behaviour boundaries and model prediction

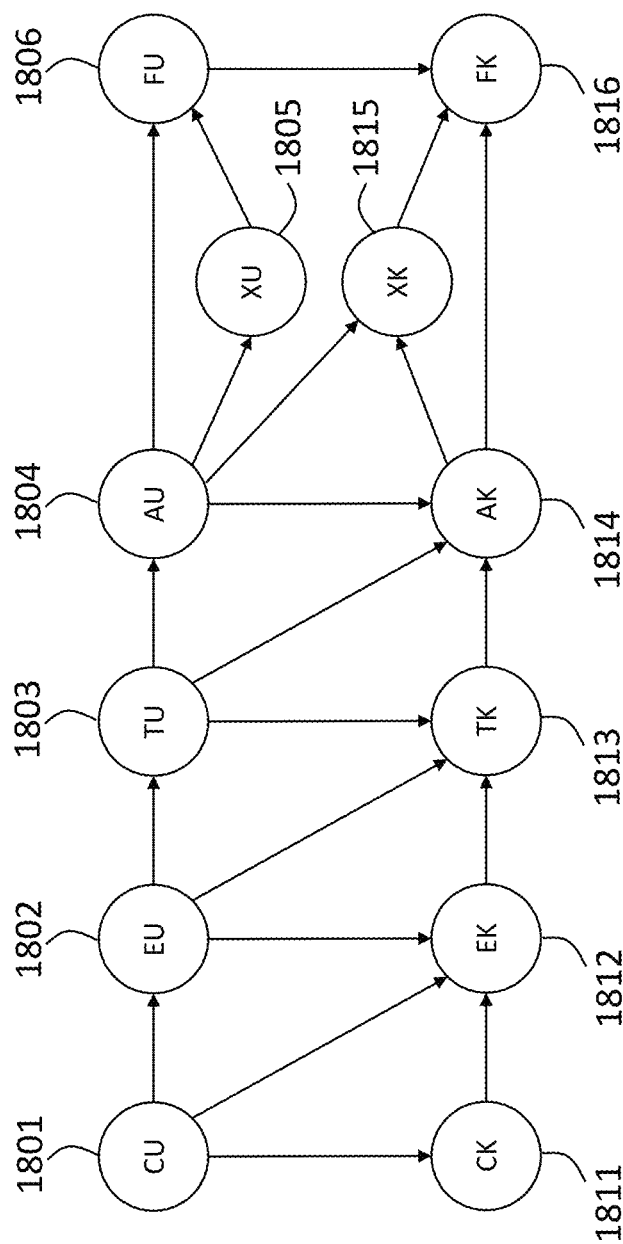
Figure 18 – Behavioural Causal Model

BEHAVIOUR MODELING, VERIFICATION, AND AUTONOMOUS ACTIONS AND TRIGGERS OF ML AND AI SYSTEMS

FIELD

An exemplary embodiment relates to the field of artificial intelligence and machine learning.

BACKGROUND

Constraint satisfaction is the process of finding a solution to a set of constraints that impose conditions that variables must satisfy. Behavior analysis is the science of predicting behavior by analyzing the dynamic behavior of systems using some constraints and related methods.

Constraint satisfaction is typically an NP-hard problem, and when couched in terms of the Boolean Satisfiability (SAT) problem, which aims to validate a propositional logic formula that is presented as Boolean combinations of atomic propositions, becomes an NP-complete problem. Typically, SAT is defined in terms of a conjunctive normal form (CNF) formula utilizing Boolean variables, with ($2^n$).

There are various usable SAT solvers for a wide range of practical problems, such as the Davis-Putnam-Logemann-Loveland (DPLL) (Davis et al., 1962) algorithm, which itself is an extension of the unit propagation method (Nieuwenhuis R. et al, 2006). DPLL utilizes backtrack search and at each step a variable and a propositional value are selected, utilizing Boolean Constraint Propagation (BCP), for branching purposes. Either 0 or 1 can be assigned to a variable for each branching step, where a branching step includes assigning the selected value to the selected variable. The DPLL algorithm backtracks for each time a conflict is identified in the formula. Backtracking may entail undoing the branching step until a branch which does not have any conflicts is achieved.

Another solution based on DPLL is Conflict-Driven Clause Learning (CDCL) (Marques-Silva et al., 2009) which solves on of the main drawbacks of DPLL, which is not able to learn from a conflict while only being able to backtrack one decision level. CDCL creates an implication graph of the assignments it inferred with Boolean Constraint Propagation (BCP) that resulted in a conflict. This implication graph is used to learn from said conflict, allowing the solver to ignore a considerable amount of the search space that will not make the formula satisfiable. The learning from such conflict allows CDCL to backtrack to more than one level decision, which solves the limitation that is present in DPLL. CDCL SAT solvers are popular as such solvers are effective and successful for diverse practical applications. Example for such application may include hardware design model checking, software checking, mathematics, and cryptography.

Satisfiability modulo theory (SMT) (Bonacina et al., 2017) solvers solve a decision problem, defined as a formula with a set of input values which produces a "yes" or "no" result. SMT solvers are generally required to handle the level of complexity that is often encountered in practical system designs. The primary goal of an SMT solver is to create verification systems that can reason at a higher complexity while still retaining the speed of SAT solvers. There are two main approaches to SMT solvers: the eager approach and the lazy approach, which both assume that an SMT problem can be reduced to a SAT problem. The eager approach employs an encoder component and a SAT solver component. The SMT formula is the input to the encoder component and the encoder converts the SMT formula to a CNF formula. This CNF formula is the input to the SAT-solver component. The SAT solver component determines if the formula is satisfiable or not satisfiable. On the other hand, the lazy approach employs a structure extractor. This structure extractor extracts the structure of the SMT formula and passes it to the SAT-Solver component. If the formula is satisfiable, a model is created and used as input to the T-solver component. The T-solver component checks the compatibility of the model and returns a result of "satisfiable" if it is compatible or "unsatisfiable" if it is incompatible.

Automated verification for neural networks may be classified on three properties: invariance, invertibility and equivalence (Leofante et al.; 2018). The initial research of automated verification on neural networks is focused on global invariance for a Multi-Layer Perceptron (MLP) architecture (Paulina et al.; 2010). Given the input domain $I^n$, output domain O and the neural network v: $I^n \rightarrow O$, as long as the input $e \in I^n$ is guaranteed to range within some prescribed interval, then $v(e) \in [a, b]$ with a, $b \in O$. (Paulina et al.; 2010) illustrated that the weights of such MLP architecture may be modified in order the satisfy the global invariance requirement.

An SMT solver, iSAT3, may be used for verification of safety (Scheibler et al., 2015). The iSAT3 algorithm utilizes interval constraint propagation to validate the consistency of theory atoms. The theory atoms in this algorithm may include linear, non-linear arithmetic and transcendental functions (e.g. $\sqrt{x}+\cos(z)<e^y$).

Bounded model checking (BMC) may be utilized in conjunction with iSAT3 to assure system safety (Scheibler et al., 2015) (Biere et al., 2003). BMC traverses a Finite State Machine (FSM) model for a particular number of steps and checks whether violations occur within this bound (Scheibler et al., 2015). A number of problems, that an exemplary embodiment may overcome, result from the BMC approach, which often is unable to solve bounded model checking instances due to the non-linearity and non-invertibility of the MLP architecture, as the nested functions of such MLP architecture makes it difficult to deduce the input values.

SMT solvers may be used for the verification of deep neural networks (DNN) (Katz et al., 2017). The algorithm is restricted to RELU activation functions in the DNN, so that the verification problem becomes NP-complete. The DNN architecture may be reduced to linear program SMT problem by using Piecewise-linear constraints (Katz et al., 2017). Such method was achieved by proposing an extension to the simplex method and utilizing a novel heuristic search method. (Katz et al., 2017) extends the theory of real arithmetic to include the binary predicate ReLU within such theory. The properties of such DNN architecture are encoded as conjunction of atoms of the proposed extended theory. A ReLU activation function w is encoded as $w_b$ and $w_f$, where $w_b$ represents the neuron connections from the previous layer and $w_f$ computes the relu of $w_b$ and is connected to the next layer. The verification proposed by (Katz et al., 2017) illustrated robustness for DNN architectures against adversarial perturbations.

An adversarial perturbation represents input observations that are formed by applying small but specific perturbations to observations that are utilized for prediction on the respective machine learning model. Such adversarially-generated observations generate wrong predictions with high confidence (Goodfellow et al., 2014) and highlight blind spots in machine learning algorithms. Such blind spots are critical in autonomous and semi-autonomous system as the input to such models may contain noise that may result in an incorrect prediction and as a result cannot assure the safety of a system to which they are applied.

Hidden Markov Models (HMM) are known for their success in various fields such as speech, handwriting, bioinformatics and for predicting situated behavior (Young and Hawes, 2013). The work described by Young and Hawes (2013) addresses the modelling of the behavior of an agent in a continuous domain by utilizing relational spatial abstraction techniques. Young and Hawes (2013) utilizes HMM by setting the latent states to the actions of the agent that are used for prediction. The observation is used as input which represents the qualitative world state. The approach presented predicts the behavior of the agent based on utilizing qualitative spatial abstraction, which may entail attribution of entities involved in the simulation, such as positioning, orientation, and velocity while utilizing three separate calculi: Region Connection Calculus (RCC), Qualitative Trajectory Calculus (QTC) and the Star Calculus. The agent observes the quantitative state of the world and abstracts it into a set of qualitative relations according to the implemented calculi to create a state representation. The state representation is used as the basis for a predictive model.

Referring to FIG. 3, another framework may incorporate four main components: the real world 300, the world as imagined 320, the safety and assurance policies 340 and the world as observed 350 (McDermid et al., 2019). The real world refers to the environment of the operation of such system when it is deployed. The world as imagined 320 refers to the modelling 325 of such system based on the perception of the real-world environment by the designers of such system. Hence, the safety analysis 330 of the world as imagined 320 is limited to the design precautions that were implemented by such designers. The world as observed 350 refers to the data produced in real-time by such system, such as images from sensors and prediction output from machine learning algorithms. Safety and assurance 340 cases are initially based on the world as imagined but may then be constantly updated by the world as observed to reflect the safety measures on the real-world environment 305 by the autonomous system 310.

Such framework is important as it highlights the gaps between the performance of the design and simulation of system components designed for an imagined environment with the performance on the observed environment. The gap between the real world and the world as imagined highlights the assumptions the data analysts make during the construction of the ML models. Such assumptions may include statistical assumptions, features selected for training data and distribution of the training data. Statistical assumptions in the world as imagined may not apply to the world as observed.

Features selected to build a machine learning model may not be available in the world as observed and such models may end up with missing data which can lead to incorrect predictions. The gap between the real world and the world as observed may be based on sensor limitations with respect to the environment conditions, certain limitations of machine learning algorithms such as encountering false positives and false negative observations and limitation of human cognitive ability in semi-autonomous systems to respond to the output of such system.

SUMMARY

According to at least one exemplary embodiment, a method for providing behavior modeling, verification, and autonomous actions and triggers of ML and AI systems, and a system and apparatus for facilitating such methods, may be shown and described.

An exemplary embodiment presents a behavior modelling architecture that is intended to assist in handling, modelling, predicting and verifying the behavior of machine learning models to assure the safety of such systems meets the required specifications and adapt such architecture according to the execution sequences of an exemplary behavioral model. An embodiment enables conditions in a behavioral model to be integrated in the execution sequence of such behavioral modelling in order to monitor the probability likelihoods of certain paths in a system. An exemplary embodiment enables real-time monitoring during training and prediction of such machine learning models and conditions may also be utilized to trigger system-knowledge injection in a white-box model in order to maintain the behavior of such a system within defined boundaries. An embodiment enables additional formal verification constraints to be set on the output or internal parts of white-box models.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 1 is an exemplary embodiment illustrating a high level XNN architecture.

FIG. 2 is an exemplary schematic flowchart of an XNN.

FIG. 3 is an exemplary prior art safety assurance framework.

FIG. 4 is an exemplary embodiment illustrating a general architecture of INNs.

FIG. 5 is an exemplary embodiment of a schematic flowchart of a proposed architecture for behavioral modeling in machine learning based systems.

FIG. 6 is an exemplary schematic flowchart of an exemplary explainable behavioral model framework.

FIG. 7 is an exemplary embodiment of a fast partial XNN architecture.

FIG. 8 is an exemplary embodiment of a behavioral model hierarchy.

FIG. 9 is an exemplary schematic flowchart of an event queueing system.

FIG. 10 is an exemplary high-level architecture of a distributed XNN training system.

FIG. 11 is an exemplary feed-forward distributed architecture for events, triggers, and actions.

FIG. 12 is an exemplary feed-forward distributed architecture for events, triggers, and actions.

FIG. 13 is an exemplary graphical model of a structural causal model integrated in a behavioral model.

FIG. 14 is an exemplary schematic diagram of an RL agent FSM/Markov process.

FIG. 15 is an exemplary schematic flowchart illustrating conditional constrain on an explainable architecture.

FIG. 16 is an exemplary schematic diagram illustrating the evolution of the labelled partitions.

FIG. 17 is an exemplary schematic diagram of the behavioral model boundaries and model prediction.

FIG. 18 is an example schematic diagram of a behavioral causal model.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

Machine learning techniques are known for solving complex problems such as image recognition and anomaly detection by utilizing deep learning techniques. However, it has been proven that machine learning models suffer blind spots, such as adversarial perturbations (Goodfellow et al., 2014), which are formed by applying small but specific perturbations, and which cause such models to predict the wrong output with high confidence. Additionally, any AI models that are not inherently understandable and interpretable from a model and/or model component point of view, make it impossible to guarantee and predict their behavior over the entire space of possibilities that they may encounter, both under normal operating circumstances and emergency or abnormal situations. Behavior Modeling of AI models and systems is needed to explain, predict, understand and control the behaviour of AI models that allow for introspection of their inner workings. An AI system may be modelled using a behavior model, to define the flow of the components of such system.

Behavior Modeling may define the execution flow of the components of a defined exemplary system and enables constraints, events, conditions, triggers and actions to be added in any combination. Examples of such behavioral models may include Finite State Machines (FSM), Petri Nets, Z, VDM-SL, AMN/B, State Charts, CSP, TLA+, Larch, OBJ, Lotos and Actor Models.

FSMs may begin at a start state, where the computation begins, and may then transition to other defined states according to the transition function. An FSM is typically represented by a 5-tuple vector as defined in Equation 1.

$$<Q,\Sigma,\delta,q_0,\mu> \quad (1)$$

Q represents a set of states, $\Sigma$ is a set of finite symbols that the FSM accepts in such model, $\delta$ represents the transition function, $q_0$ is a start state and $\mu$ represents the final states of such model where $\mu \subseteq Q$.

An FSM with probabilities for each transition between states is called a Markov chain. Such probabilities are known as transition probabilities. A Markov chain is a discrete-time stochastic process that makes use of the Markov property with a set of states Q. The Markov property is defined by when each future state $s_f$, where $s_f \in Q$, is conditionally independent of the prior state given the current state. Conditional independence may be defined in terms of a state u and observation o as follows: given two states $u_1$ and $u_2$ that are conditionally independent of an event g, the states $u_1$ and $u_2$ are independent events in their conditional probability given g, as shown in Equation 2.

$$P(u \cap o|g) = P(u_1|g)P(u_2|g) \quad (2)$$

This concept can also be modelled via the concept of directional separation (d-separation) in causal models, where casual information is used to model conditional independence in ways that are beyond what Markov models can ever express.

A variant of the Markov chain where the current state is not observable is a Hidden Markov Model (HMM). An HMM, defined as shown in Equation 3, generates the probabilities B, where each probability value refers to the probability of an observation $o_k$ from a state $q_i$. Q represents a set of states, where $Q=\{q_1, q_2, \ldots, q_N\}$. O represents the sequence of observations, where each observation $o_i$ is drawn from a vocabulary V, where $V=\{v_1, v_2, \ldots v_n\}$. A represents the transition probability matrix, where the probability refers to moving, for example, from the current state is $q_i$ to the next state $q_j \ldots \Pi$ refers to the initiate state distribution of the state $s_i$. An HMM interpret its states, where such states are not directly observable, by analyzing the pattern of a sequence of observed symbols from such states.

$$<Q,A,O,B,\Pi> \quad (3)$$

Petri Nets may provide a graphical notation to describe complex systems and processes. Petri Nets may be constructed as directed graphs. Exemplary Petri Nets may include five elements as shown in Equation 4. P may represent a finite set of n places. L may represent a finite set of transitions. EV may represent the flow relation between P and the transitions L. W may represent the weight mapping for EV and $m_0$ may represent the initial representation of P.

$$N=<P,L,EV,W,m_0> \quad (4)$$

An actor model may refer to a mathematical concept utilized in concurrent computation modelling. An actor in an actor model may be defined as a unit of computation. An actor may include a message queue and an internal state. A message queue may contain messages received from other actors. The private state of an actor may be updated by the processing of a message. Internal states and message passing behavior can then be represented using various means including process calculus such as CSP, CCS, ACP, LOTOS, π-calculus, ambient calculus, PEPA, fusion calculus and the join-calculus. Such actor models can have their behavior modelled using a combination of parallel composition of behaviors, communication and transmission models, sequential composition of behaviors, reduction and interpretation rules, and abstraction rules that hide complexity and inner workings of a component from other components.

Exemplary explainable architectures may be integrated in a behavioral model BM. Exemplary embodiments of explainable architectures that may be integrated in the behavioral model BM include, but are not limited to, eXplainable artificial intelligence (XAI) models, Interpretable Neural Nets (INNs), eXplainable Neural Nets (XNN), eXplainable Transducer Transformer (XTT), eXplainable Spiking Nets (XSN) and eXplainable Memory Nets (XMN) models. A further exemplary embodiment may present methods for detecting bias both globally and locally by harnessing the white-box nature of eXplainable Reinforcement Learning (XRL).

Although some examples may reference one or more of these specifically (for example, only XAI or XNN), it may be contemplated that any of the embodiments described herein may be applied to XAIs, XNNs, XTTs, XSNs, or XMNs interchangeably. Another exemplary embodiment may relate to bias detection in INNs and related grey-box models, which may be a hybrid mix between a black-box and white-box model. An exemplary embodiment may apply fully to the white-box part of the grey-box model and may apply to at least some portion of the black-box part of the grey-box model. It may be contemplated that any of the embodiments described herein may also be applied to INNs interchangeably.

Exemplary embodiments may also be implemented entirely in hardware using a dedicated fixed hardware circuit such as an ASIC implementation, reprogrammable FPGAs, quantum computers, neuromorphic chips, or analog/digital electronics. The transmission can be implemented entirely in hardware when using flexible architectures that can configure themselves dynamically. A mixture of dedicated hardware and software, and more general CPU-based solutions are also possible.

BMs may be implemented in practice using a combination of practical options including but not limited to Finite State Machines (FSM), Petri Nets, and Actor Models. BM implementations may also utilize a message broker or other suitable form of middleware system. BM implementations may also utilize a workflow system or other suitable form of process control system.

A behavioral model BM may include conditions $BM_c$, events $BM_e$, triggers $BM_t$ and actions $BM_a$ based on attributions and information retrieved from internal states of the explainable architectures or from the output of the computation from the explainable architectures $BM_x$. The output may include any related meta information of the explainable architectures.

An exemplary XNN is a new type of Artificial Neural Network (ANN) that may be inherently interpretable and explainable. The inner network structure of an exemplary XNN may be fully interpretable. Interpretability may be built within the architecture itself, yet it may function like a standard neural network. This eliminates the need to apply additional techniques or processing for interpreting the result of a neural network. XNNs may compute both the answer and its explanation in a single feed-forward step without any need for simulations, iterations, perturbation, etc. XNNs may be also designed to be easily and efficiently implementable both in software and in hardware, leading to substantial speed and space improvements.

The architecture behind an XNN works by combining multiple local models into one global model. Local models analyze a small area within the entire search space. In an embodiment, when a transaction is analyzed in a local manner, a linear model is sufficient to explain the model. On the other hand, global models may facilitate in understanding the model with a holistic view. Exemplary XNNs work by merging the two: multiple partitions representing the local zones, and multiple linear and non-linear models to explain each partition, which when combined make up a global model. Additionally, XNNs may go beyond linear data, and may be designed to cater for non-linear data by embedding transformations within the neural network itself while retaining explainability. Each layer, neuron, and connection within an XNN has a precise and well known and understandable function, unlike standard ANNs that are uninterpretable black-box systems. XNNs are thus the first ever known fully white-box ANNs, giving rise to new category of neural networks that are understandable and interpretable.

XNNs also have a desirable property in terms of bounded model checking as they represent a class of neural networks known as Wide Neural Networks (WNNs). This has the effect of reducing the levels of nesting that is pervasive in Deep Neural Networks (DNNs), making constraint satisfaction systems easier and more practical to implement.

Referring now to exemplary FIG. 1, FIG. 1 may illustrate a schematic diagram of an exemplary high-level XNN architecture. An input layer 100 may be inputted, possibly simultaneously, into both a conditional network 110 and a prediction network 120. The conditional network 110 may include a conditional layer 112, an aggregation layer 114, and a switch output layer (which outputs the conditional values) 116. The prediction network 120 may include a feature generation and transformation 122, a fit layer 124, and a prediction output layer (value output) 126. The layers may be analyzed by the selection and ranking layer 128 that may multiply the switch output by the value output, producing a ranked or scored output 130. The explanations and answers may be concurrently calculated by the XNN by the conditional network and the prediction network. The selection and ranking layer 128 may ensure that the answers and explanations are correctly matched, ranked and scored appropriately before being sent to the output 130.

The processing of the conditional network 110 and the prediction network 120 is contemplated to be in any order. Depending on the specific application of the XNN, it may be contemplated that some of the components of the conditional network 110 like components 112, 114 and 116 may be optional or replaced with a trivial implementation. Depending on the specific application of the XNN, it may further be contemplated that some of the components of the prediction network 120 such as components 122 and 124 may be optional or replaced with a trivial implementation.

It may further be contemplated that in some circumstances, the selection and ranking layer 128 and the output 130 may be combined together into one integrated component. For optimization purposes, the XNN may also be implemented with both the conditional network 110 and the prediction network 120 together with all their components merged together into one network. This merged conditional and prediction network may also be merged together with a combined selection and ranking layer 128 and the output 130. This optimization may still result in a logically equivalent XNN, which may be faster for feed forward processing but may potentially operate less efficiently when it comes to training via backward propagation and gradient descent techniques.

The XNN can thus be implemented in such a manner that the input layer 100 is provided, as well as a combination of the conditional network 110 and the prediction network 120, including the conditional layer 112, aggregation layer 114, switch output layer 116, feature generation and transformation layer 122, fit layer 124, prediction layer 126, and ranking layer 128 leading to the output 130. This combination may apply to exemplary embodiments and implementations of the XNN, including both software and hardware implementations. The transformation capabilities of XNNs in this regard are unique and unparalleled in other neural network implementations since the white-box nature of XNNs allows flexibility and extreme merging to be performed without affecting the logical behavior of the XNN, which may also be reflected in various attributes of a practical implementation, such as size/space usage, performance, resource usage, trainability and overall throughput.

Referring now to FIG. 2, FIG. 2 may illustrate an exemplary XNN architecture which combines the results from the switch output layer and the value output layer. The example depicted in FIG. 1 is logically equivalent to the following exemplary ruleset:

$$f(x, y) = \begin{cases} \text{Sigmoid}(\beta_{0,0} + \beta_{1,0}x + \beta_{2,0}y + \beta_{3,0}x^2 + \beta_{4,0}y^2 + \beta_{5,0}xy), & x \leq 10 \\ \text{Sigmoid}(\beta_{0,1} + \beta_{1,1}x + \beta_{2,1}y + \beta_{3,1}x^2 + \beta_{4,1}y^2 + \beta_{5,1}xy), & x > 10 \wedge x \leq 20 \\ \text{Sigmoid}(\beta_{0,2} + \beta_{1,2}x + \beta_{2,2}y + \beta_{3,2}x^2 + \beta_{4,2}y^2 + \beta_{5,2}xy), & x > 20 \wedge y \leq 15 \\ \text{Sigmoid}(\beta_{0,3} + \beta_{1,3}x + \beta_{2,3}y + \beta_{3,3}x^2 + \beta_{4,3}y^2 + \beta_{5,3}xy), & x > 20 \wedge y > 15 \end{cases}$$

The ruleset may be found following the activation function 220. The exemplary architecture in FIG. 1 may begin with an input 100. The input may then be used as inputs to the conditional network 110 and the prediction network 120. The prediction network may contain a feature generation and transformation layer 222, a fit layer 224, and a value output layer 226.

The value output layer 226 may provide equations which correspond to rules which weigh different features of the inputs. Further, the input 100 may be used as input to the conditional network 110. Again, the conditional layer 212 and aggregation layer 214 may produce conjunctive rules or other logical equivalents or partitions which are represented in the switch output layer 216.

The outputs of the value output layer 226 and the switch output layer 216 may be combined in the output layer 130. Once the output layer 130 has been formed, a sigmoid or other activation function 220 may be applied to the result 218, depending on the application.

XNNs may present an intuitive way to construct interpretable models, while still utilizing the power of ANNs and related methods such as deep learning. Once the model is trained through back-propagation or a similar method, the resulting neural network can be used to serve predictions and the inner structure of the XNN can be used to construct the rules.

An explainable reinforcement learning system may be based on the well-known Bellman equation. XRL introduces explanations to the actions and the environment where the XRL system is deployed. An action may refer to the input provided to the environment, calculated by applying a policy to the current state. This may be discrete or continuous. The set of all possible actions is called "action space."

FIG. 14 shows an FSM/Markov Process representation for a typical Reinforcement Learning (RL) agent. In 1400 one may note the action selection and ranking, that is, some action a for the current state s, which leads to state s'. The reward is denoted by r. The RL agent may have a simulation of the environment used in the action selection process. The model may have additional connection points, depending on the structure of the model itself.

The first XRL modification may introduce explanations x as part of the model/environment model. That is, the world model can give back a partial or full explanation about the state s' and the reward r, which may be defined as $x_e$. Another modification is in the action space, which introduces an associate explanation, that is a, $x_a$ which may denote action and explanation of the action, respectively. A policy may refer to the mapping from the past experience to an action. The policy Π, in XRL becomes $\Pi_x$, which is now an explainable mapping, such that:

$$\Pi_x \approx s \rightarrow a, x_a$$

$$\Pi_x \approx s, x_s \rightarrow a, x_a$$

In terms of behavioral FSM each (state, action) pair can have a constant connection point prior to making the action after selecting the state, during the action, and after the action is made. For reinforcement learning and XRL, another connection point is before, during and after the selection of the action under a policy π. This is applicable when action space and/or the state space is either discrete or continuous. Explainable portions of the XRL learning process may lead to better safety and control mechanisms by allowing for better understanding of the inner working of the system which may require adjustments, monitoring and automatic/manual interventions.

Explainable Transducers Transformers (XTTs), provide an alternative embodiment which use: (i.) one or more transducers in a pipeline that outputs the answer together with its explanation as part of the transduction process, and/or (ii.) a suitable transformer architecture, that may optionally be a replacement for gated recurrent neural networks or similar type of machine learning models, where the attention mechanism is extended to cater for the creation of the explanation alongside the answer. The encoder part of the transformer may encode information about what parts of the input data is relevant to each other, together with information about what parts of the explanation data is relevant to each other and may encode it in a latent space that encodes both the answer and the explanation. The decoder part of the transformer may decode the encodings while using the attention mechanism to construct and eventually output both the answer and its associated explanation. It is contemplated that alternative embodiments, such as using separate latent spaces for the answer and the explanation, and other logical modifications that may be amenable for practical and efficient implementations, especially for large scale parallel processing and also for hardware deployments may be used.

Interpretable Neural Networks (INNs), as shown in FIG. 4, provide an architecture which can automatically generate an explanation using existing deep learning techniques. INNs can utilize existing software infrastructures and hardware used for neural networks and are also remain fully compatible with backpropagation training techniques.

The architecture may include a feature transformer which converts the input to some hidden features, and a number of relevance estimators which transform the hidden features to feature weights. The feature weights are then combined with the transformed input in order to extract the attribution of each input transformed feature. The resulting feature attributions are then aggregated for the result. Feature attribution may be extracted at different levels. In the simplest form, attribution may be linked directly with the original inputs. In other cases, such as CNNs, feature attribution may also be computed for higher-level features which are typically found in kernels and filters. Additionally, INNs may split the model in various partitions, thus enabling a higher-level of flexibility and interpretability, by enabling a mixture of local or segmented explainability. In some exemplary cases, INNs are also capable of providing global explainability.

Referring to FIG. 4, an exemplary embodiment of an INN general architecture may be illustrated. An exemplary architecture may start with some input vector X 400. The input is then connected to a feature generation and transformation network 402 and to k relevance estimators 404. The transformed features may be abstract or high-level features which could have been computed using a deep neural network such as CNN, a non-linear mathematical function such as polynomial expansion or some other form of generated features, which may be discrete or continuous. An exemplary relevance estimator may calculate the coefficient, at least in a local manner, of each transformed feature.

In mathematical terms, the transformation network may be denoted as a function $T(X)$. Similarly, $\theta_j(X)$ represents the relevance function of the $j^{th}$ partition. If $X \rightarrow T(X)$ returns a vector with z transformed dimensions, then $X \rightarrow \theta_j(X)$ also returns a vector with z coefficients, or relevance weights. It is assumed that $|T(X)|=|\theta_j(X)|=z$.

An exemplary INN may be flexible enough such that it allows modelling of complexity through various options and configurations. The functions $X \rightarrow T(X)$ and $X \rightarrow \theta_i(X)$ may be a deep neural network which makes it possible to model complex abstract features. It may be noted that the combination of $T(X)$ and $\theta_i(X)$ may represent various embodiments of explainable models which are possible to implement with the INN architecture.

In step 406, the neural network may handle the conditional aspect of the model. That is, it may evaluate rules in the form of IF-conditions in order to activate one or more partitions. The output of $C_i(X)$ may be binary—that is, 1 or 0. It is also contemplated in an alternative embodiment, that the output could be a real number using a Type 1 or Type 2 fuzzy logic system. It is also contemplated in an alternative embodiment, that the output could be with reference to at least one of an associated tree, graph or hypergraph structure, a simplicial complex, a taxonomy, an ontology or causal model. It may be noted that the partitions may be static or dynamic, and they may be discovered either through an external partitioning process or through a connected neural network. It may also be noted that INNs may also function with only one partition; that is, for all values of X, $C_i(X)$ is always one. This is equivalent to having zero partitions. In this case, there is no need to apply a partitioning method to find suitable partitions.

In step 408, the neural network may compute the feature attribution of each transformed feature, which is activated by the associated partition. The relevance attribution works by multiplying the result of the computed coefficient with the transformed feature. In mathematical terms, step 408 may compute $\theta_j(X)T(X)$ for the $j^{th}$ partition. The output of layer 408 serves the basis of explanation generation. The values from this layer may be used to generate feature attribution graphs, heatmaps, textual explanations or other form of explanations. In step 410, the neural network may aggregate the results for each partition. This is the predictive result for the activated partition. In mathematical terms, an exemplary aggregation function may be defined by $A_j(\theta_j(X)T(X))$. In an exemplary setting, the aggregation function may be a simple summation of the feature attributions. This becomes equivalent to a linear function, at least functioning in a local manner, such that the result $R_j=\theta_j(X)_1T(X)+ \ldots +\theta_j(X)_zT(X)$.

Finally, the switch layer 420 may select the activated partition. If more than one partition is activated, some ranking 425 may need to be applied. The result may be generated through the layer 430. An exemplary embodiment may use causal modeling as part of the proposed explainable framework. Causal inference measures the effect of causes on specific units. An example of the causal inference may relate to medical causes t and c. The output variable y of a causal inference measures the effect of the causes on a patient u, and can be illustrated as $y_{t(u)}$ and $y_{c(u)}$. The effect of the cause t on a patient u relative to cause c on a patient u can be measured and/or estimated accordingly. Coefficients may be extracted from the explainable model and used as input to the causal inference model. The output of such causal model may be used to trigger an event or a terminal action in the system. Causal model output may also be fed back as an input to the explainable model and so on, according to the needs of the implemented system. Causal models may also be combined in the explainable model and/or in the BM together with inductive, deductive and abductive logic to form behavior predictions. Using inductive logic, BMs may predict future behavior based on generalized rules and knowledge that may have been learnt fully automatically. Using deductive logic, BMs may predict behavior according to a combination of one or more conditions or constraints. Using abductive logic, BMs may retrofit an observed scenario to a known set of possible states in the BM, or be able to explain the currently observed behavior in a reasonably acceptable manner. Abductive logic can also be useful in practical implementations of diagnostic systems and can be used to aid in the diagnosis and troubleshooting of AI systems using behavioral monitoring and predictive data.

In an exemplary embodiment, each environment in the framework proposed by McDermid et al. (2019) may be seen as a behavioral model BM as described in FIG. 3. The Real World 300 represents the Desired Behavior Model DBM. DBM represents the behavior the system is trying to achieve while utilizing explainable architecture and causal modelling. DBM may be formally verified according to the given constraints in order to validate the system before being deployed in production. The observed behavioral model OBM 350 refers to the behavioral model that is deployed in the system and may be observed by gathering information via runtime monitoring of this model. The expected behavioral model EBM refers to the behavioral model that is constructed based on the world as imagined 320. The formal verifications, simulations and synthesis are based on the behavior that is imagined by the designer of such system, based on the imagined scenarios of the real world 300. Safety and Assurance 340 constraints and guarantees may be represented by a behavioral model framework and/or behavioral model hierarchy that assures the safety, which may include conditional constraints and/or model boundaries, in the observed behavioral model OBM and/or the expected behavioral model EBM.

BMs provide a powerful and practical way of implementing causal systems, elucidating and delineating the concept of a Cause and Effect in a precise and unambiguous manner that can be measured and estimated precisely, using an appropriate combination of statistical and causal methods, such as interventions and counterfactuals via Pearl's do( ) operator. Actions in themselves are not definable using standard probability theory as they are modelled using causal interventions. BMs can be used to model a Causal System, as exemplified by the general Causal DAG presented in FIG. 18. In FIG. 18, BMs are used to model cause-and-effect by breaking down a Cause into three parts: the set of Conditions {CU 1801, CK 1811}, followed by the set of Events {EU 1802, EK 1812} generated by those Conditions, and finally followed by the set of Triggers {TU 1803, TK 1813} that are activated via the Events. Once the Triggers activate, Actions {AU 1804, AK 1814} act as the agent of the Cause, which then produces a mix of Observable {FU 1806, FK 1816} and Unobservable {XU 1805, XK 1815} Effects. The variables {CU 1801, EU 1802, TU 1803, AU 1804, XU 1805, FU 1806} represent exogenous variables, while the variables {CK 1811, EK 1812, TK 1813, AK 1814, XK 1815, FK 1816} represent endogenous variables. Various practical implementation methods exist to implement Causal BMs, including but not limited to using Pearl's structural causal models and associated derivations and variations, dynamic causal models and associated Bayesian model comparison methods and variations, granger causal models, relativistic causal models arising from special and general relativity, and other suitable implementations that allow machine learning to represent cause-and-effect. The identification of the effect of an action is a key criterion in these practical implementation methods. Information loss and the fact that perfect observation and measurement is generally unachievable in most practical real-world applications is modelled intrinsically via the mediator variables {XU 1805, XK 1815}, which create the generally non-identifiable mediation paths {AU 1804→XU 1805→FU 1806}, and the identifiable mediation paths {AK 1814→XK 1815→FK 1816} (generally representing known sources of mediation) and the more difficult mediation path {AU 1804→XK 1815→FK 1816} (generally representing unknown sources of mediation). The Causal BM model thus makes it easier to precisely distinguish and identify the actual cause, incorporating evidence, handling causal beams, path-switching and temporal pre-emption in a more precise manner than with standard causal DAGs that do not distinguish between conditions, events, triggers, actions and unobservable and observable effects. The Causal BM presented in FIG. 18 is an example of a novel, universally applicable causal model template, that can handle general acyclic cause-and-effect models. Coupling Causal BMs with a generic AI model or an explainable AI model, gives AI a novel capability of handling causality. The neuro-symbolic nature of explainable AI models such as XNNs and XTTs and their inherent compatibility with causal models, allows Causal BMs to impart environmental context and awareness to the explainable AI models. The exemplary Causal BM in FIG. 18 may be easily converted into a symbolic format, for example, {EK 1812} at time t may be represented by $EK_t = c_t CU_t + d_t CK_t + e_t EU_t + E_t^{EK}$ where $c_t$, $d_t$, $e_t$ are causal relation coefficients and $E_t^{EK}$ is a noise term.

Furthering the example presented in FIG. 18, a cyclical extension can be achieved by having cyclical relations from each component to the next cycle, for example, from {$CU_t$ 1801} to {$CU_{t+1}$ 1801} and so on. Additionally, an element of information loss per cycle can be optionally modelled by having a flow from the exogenous variables of cycle t to the newly updated exogenous variables of cycle t+1. The cyclic version of the exemplary Causal BM in FIG. 18 may be easily converted into a symbolic format, for example, {EK 1812} at time t may be represented by $EK_t = c_{t-1} CU_{t-1} + d_{t-1} CK_{t-1} + e_{t-1} EU_t + c_t CU_t + d_t CK_t + e_t EU_t + E_t^{EK}$ where $c_{t-1}$, $d_{t-1}$, $e_{t-1}$, $c_t$, $d_t$, $e_t$ are causal relation coefficients and $E_t^{EK}$ is a noise term.

A Distributed Explainable Architecture DEA may be utilized in a behavioral model framework in order to increase the performance of the defined models. A distributed explainable architecture DEA may contain multiple explainable architectures $DEA_m$, such that $m \in \{x_1, x_2, \ldots, x_n\}$, where $x \in \{XAI, XNN, XTT, XRL, XSN, XMN, INN\}$, or logically equivalent or similar architectures that are amenable to be processed in parallel. The number of explainable architectures 1010 in an exemplary distributed framework may be defined as $DEA_n$. FIG. 10 illustrates a high-level architecture of an exemplary distributed training system, where $DEA_m$ refers to the parallel $DEA_n$ explainable models, where $DEA_n$ is the number of models in such framework.

Distributed explainable architecture DEA may split the dataset into multiple subsets 1000 of data in order to train the explainable architectures $DEA_m$. The models trained in the exemplary distributed framework DEA may be aggregated 1020 during the training phase by calculating the average (or weighted average) from the parallel models. The aggregate model may be formed based directly on the weights of the model, rather than from the result of the individual models. An exemplary distributed explainable architecture DEA may be useful for large datasets where the training data cannot fit in the CPU/GPU memory of a single machine.

An exemplary distributed explainable architecture DEA may incorporate a combination of hybrid models, ensembles, and mixture of experts. Exemplary hybrid models in the architecture may be a mix of x, where $x \in \{XAI, XNN, XTT, XRL, XSN, XMN, INN\}$, or logically equivalent or similar architectures. An exemplary embodiment may implement multiple different models. For example, one data part may implement an XNN while another data part of the same system may implement an XAI. The models may then be combined to create an aggregate model. The aggregate model may be equal to x, where $x \in \{XAI, XNN, XTT, XRL, XSN, XMN, INN\}$, or logically equivalent or similar architectures, or may be a hybrid model implementing multiple different models.

A distributed explainable architecture DEA may incorporate multiple independent models where one such model, once trained, can work independently without the need to rely on the full distributed architecture, which is optimized primarily for training purposes. The models in a distributed explainable architecture DEA may be a variant of the explainable architectures x. Such variants may include convolutional XNNs (CNN-XNNs), predictive XNNs (PR-XNNs), text XTTs (T-XTTs).

A conditional constraint c may be based on a defined liability threshold model and/or on the internal coefficients of the explainable architecture x 500 as shown in FIG. 5, where $x \in \{XAI, XNN, XTT, XRL, XSN, XMN, INN\}$ or logically equivalent or similar architectures, or the causal architecture 510. Conditional constraints may also be used to analyze sequences of data that are ordered according to the value of one or more variables, including temporally ordered data sequences. The activation of such constraint causes an event 520 to be fired and activates trigger t 530. Trigger t may trigger additional events e 520 within the proposed behavioral architecture, trigger a terminal action a 540 of a certain operation, or trigger a feedback action a 550. A feedback action a 550 may trigger internal tasks from sub-components 560 of such system, execute an event e in an acyclical manner, or execute an event e in a cyclical manner in order to activate a trigger t 530 for a certain operation. A feedback action may update the explainable architecture coefficients.

A behavioral model BM may incorporate feedback actions $BM_{af}$, where $BM_{af} \in \{af_1, \ldots, af_n\}$ as an input to the underlying explainable architecture x, where x∈{XAI, XNN, XTT, XRL, XSN, XMN, INN} or logically equivalent or similar architectures. $BM_{af}$ represent feedback processes of sub-components within the behavioral model system or an update process that is received from the server of such behavioral system BM.

An exemplary embodiment of a feedback process task may refer to an output from a trigger t in $BM_t$ being used to update specific internal parts of the explainable architecture x in $BM_x$. Such feedback may be facilitated by the explainable architectures in $BM_x$ being white-box models, wherein the coefficients and internal parts of such white-box models are interpretable. Similar operations may be more difficult when using black-box models in the behavioral model BM.

Human knowledge injection or system knowledge injection is another type of input in a behavioral model BM. The coefficients θ of an explainable architecture x 500, within a behavioral model BM, where x∈{XAI, XNN, XTT, XRL, XSN, XMN, INN} or logically equivalent or similar architectures, may be modified to enforce specific rules. Rule enforcement may also be activated by a conditional constraint located in $BM_c$, where $BM_c \in \{c_1, \ldots, c_n\}$. Activation fires an event e and event e may activate a trigger t 530 where rule enforcement may be passed using a feedback action 550 to the explainable model 500 or causal architecture 510.

A named reference label may be assigned to particular components within an explainable model and/or a behavioral model. Named reference labels may be descriptive in nature and may also contain additional meta-data and links to external taxonomies, ontologies and models. A named reference label may consist of symbolic expressions and/or formulas of the form of conjunctive normal form (CNF), or disjunctive normal form (DNF), or a suitable first order logic, to provide an explanation of the set or sequence of decisions that resulted in the execution of the current component, in the behavioral model BM, which we refer to as the path trace. An "activation path" may be defined as a data flow path followed by an AI model, starting from a particular input and ending in a particular output prediction. The path trace is set or sequence of decisions, nodes, transitions, or applicable description structures for the particular AI model describing the activation path.

For example, named reference labels may contain meta-data about multimedia files associated with that named reference label, units and dimensions associated with the explainable model component, and so on. The named reference label itself is a direct form of symbolic reference, that can either be the named reference label text itself or an associated meta-data. In FIG. 16, components 1607, 1608, 1609 and 1610 all have associated named reference labels and may thus be associated with a neuro-symbolic model.

In an exemplary embodiment, the named reference labels themselves may also be used by a suitable model discovery system or model optimization system, such as an exemplary AutoXAI system, to generate human-friendly explanations of dynamical processes that may be otherwise very difficult to explain. It may be further contemplated, the named reference labels may remain invariant throughout such dynamical processes, even though the precise location, connection and relationship between the part and the whole of the relevant named component may change. Such invariance under dynamical processes makes named reference labels an ideal component for use within explanations.

In another exemplary embodiment, the same invariance of named reference labels under dynamical processes may be utilised by a behavioral model BM to generate stable, long-term explanations of the dynamics occurring within an AI model without having to recode knowledge or retrain explanatory methods with each run of the dynamical process.

For example, if FIG. 16 was referring to an exemplary explainable model that predicts property prices, and component 1609 was representing a decision or rule, such as "Count(Bedrooms)>50" and component 1610 was a node that represents "Property Type='Palace'", the user may assign a named reference label of "More than 50 Bedrooms" to 1609 and a named reference label of "Palaces" to 1610. Rule and hierarchical partition data from the explainable model may be used to automatically add symbolic meta-data to the named reference labels. Continuing with the example, the symbolic expression "Count(Bedrooms)>50" may be assigned automatically as meta-data to the named reference label for 1609 and "Property Type='Palace'" may be assigned as meta-data to the named reference label for 1610. In the example, an exemplary AutoXAI system has decided that this particular handling is no longer necessary for the explainable model, for example, if the partition structure is modified or that type of property is no longer applicable for the explainable model. In this example, a typical explanation in English may be: "The explainable model has been modified to remove the check for 'More than 50 Bedrooms' and its associated node for 'Palaces'", which is more human friendly than an edit-oriented operator listing like: "{"Deletion": [{"Edge": "1609"}; {"Node": "1610"}]}".

Any behavioral models associated with AI models that have had structural changes may need to update their dynamic explanations of the model's new behavior, and also undergo a number of consistency checks related to both the addition and deletion, and in general, modifications to the underlying AI model. With reference to the exemplary explainable model in FIG. 16, a BM associated with the model may need to handle the introduction of new nodes (variables) after connection 1608, while performing consistency checks on deleted transition 1609 and deleted node 1610.

The novel use of named reference labels in an exemplary embodiment within behavioral models and their association with evolving AI models that have been modified using a suitable dynamical process, such as AutoXAI, model discovery, or model optimization process, may enable a practical implementation of neuro-symbolic constraints that may apply to some up-stream meta-reasoning layer that has access to the statistical or causal relationships between variables.

Named reference labelling may allow the user to specify which models in the partition are to be modified, deleted, or otherwise prevented from alteration. Named reference labelling also may allow the user to keep track of model candidates that are of particular interest. In a similar manner to nodes, edges can also be named reference labelled. Partition 1604 shows one component node 1607. Partition tree 1605 shows one named reference labelled edge 1608. Partition tree 1606 shows a named reference labelled circle 1609 that has been deleted.

Named reference labels may also be used to integrate explainable AI models and BMs with neuro-symbolic AI systems that can utilise symbolic rule expressions and be used to perform automated symbolic checks and verification that is impossible to do with a black-box AI system. The combination of a white-box AI system and a BM is particularly powerful, as it allows end-to-end understanding of the functioning of the AI system together with prediction and control of its behaviour. Furthermore, this combination allows for both static verification and logical boundary-type checks of the AI system and the BM, together with dynamic checks, monitoring and verification of the AI system and the BM.

Continuing with the previously presented example with reference to FIG. 16, a model evolution where edge 1609 and node 1610 have been deleted may correspond to an exemplary rule like: "IF (Count(Bedrooms)>50) THEN Property Type='Palace'" being deleted or otherwise disabled. In a system that is used to generate symbolic expressions within a workflow system or even an artificial software and/or hardware development language, this model evolution change may represent a change in the workflow or relevant code snippet. It may be further envisaged that an exemplary model evolution explanation may be used to report and integrate such a change with appropriate change-management and audit systems. For example, in an audit system (used for illustrative purposes), the edit operator lists and the model evolution explanation may be saved in a system of record, distributed ledger technology (DLT), database, audit log, or some other suitable system, or transmitted externally (for example, they may be transmitted securely over a telecommunications network, to ensure that a tamper-proof and traceable change record is kept securely in a trustworthy manner). In a further example, where the explainable model is linked to a workflow or a code system, the model evolution explanation may be used as a practical interface with a version control system, for example by creating an appropriate changelog entry. An example changelog entry may read:

commit 5530219c4af5fb13c8301677415f9440
Author: Bart <bart.fitzgerald@umnai.com>
Date: Thu March 15 09:44:13 2018+0800
  deletion: PROPVALUE-MODEL-111: Removed check for 'More than 50 Bedrooms' and its associated node for 'Palaces'
  Closes #14580

It is further contemplated that a BM may utilize its own audit system log that can be stored in a system of record, DLT, database, or some other suitable system in a tamper-proof and traceable manner. Such audit information may be either stored in an independent system that is separate from the associated AI model, or share the same audit system used by its associated AI model.

In an exemplary embodiment, a BM may implement audit log functionality. An exemplary application of such BM audit log information is in the creation of decision logs and path traces that clearly illustrate the flow, interactions and behavior of the BM and its conditions, events, triggers and actions and overall dynamics. It is contemplated that path traces may be implemented in expert systems and rule-based systems as an annotated sequence of rules that have been triggered and executed. It is further contemplated that path traces may be implemented in workflow systems as an annotated sequence of workflow nodes and paths that have been executed by the workflow engine. The path trace can be used to illustrate the precise sequence and behavior of the BM and may be implemented and configured to display nearest neighbors along the path that may be of interest to the user.

Explainability may refer to the mapping of internal symbols, located in a robot, to a language that is understandable by a human. A robot that utilizes a behavioral model BM is able to map any component within BM to a human understandable language. This is possible because the internal components of the explainable system 500 510 are an interpretable white-box model, and the events 520, triggers 530 and actions 540 550 are interpretable by a human. A behavioral model BM enables a robot to state the action it is currently executing and explain why it is doing the current action. A behavioral model may generate a global structural explanation of itself, by using named reference labels as an interpretable path trace for the components of BM. A behavioral model may further generate an explanation specific to the dataset(s) that have been encountered by its associated AI models. Such a dataset specific explanation may contain references to the named reference labels of the executed paths for the respective data.

With reference to FIG. 16, it is further contemplated that the evolution of an associated AI model with a BM, may be explained, and optionally visualized, as a graph of changes that have been applied to the model, or as an evolutionary graph that uses named labels for modules (nodes) and connections (edges) in the AI model to explain how the new version of the AI model was obtained. The model evolution explanation may be used to report and integrate such changes with appropriate change-management and audit systems implemented in the BM associated with the changed model. Such change-management systems in the BM may ensure that consistency, coverage, and causal sufficiency checks and other related checks are performed at the appropriate time.

Neuro-symbolic nodes in a behavioral model BM may be converted to a pseudocode and vice-versa. It is further contemplated that a BM utilized in conjunction with an appropriate explainable model that is also neuro-symbolic may lead to a fully end-to-end practical neuro-symbolic AI implemented solution. In an exemplary embodiment, with reference to FIG. 17, a neuro-symbolic node 1795 may consists of multiple children nodes. The neuro-symbolic node 1795 may be converted into a pseudocode as follows:

Program neuro-symbolic node:
    Set node attributions and variables
    Set node children
    For each child in the node:
      Run Program neuro-symbolic node The general rule for converting connectionist-based BMs to symbolic code is to treat the transition (edges) within a BM as a function call or similar process or algorithm oriented sub-routine, and to treat the node (a neuron in a neural network or a state in a Petri net or FSM) as a variable or object that can be read from and assigned to. With reference to FIG. 12, the event node 1250 may be modelled as an event object that raises a trigger function call 1260 which is consumed by another object or some appropriate module 1270 that executes the appropriate and relevant action The results from such action are then consumed by further parts of the system in a sequence that eventually produces the desired result.

In an exemplary embodiment, a robot r is able to provide a human understandable explanation $r_e$ of why the robot r is performing an action $a_i$, by outputting the explanation $r_e$, that may consists of the activated triggers, events, conditional constraints and/or named reference labels, that are related to the trace of the execution of the current component.

Constraint Satisfaction Problem (CSP) may be seen as a generalization of the SAT problem. The objective of a CSP is to check that all the constraints are satisfied, for all the variables being assigned values from their respective domains. Algorithms that solve constraint satisfaction problems may generate explanations by using a cost function that quantifies human interpretability (Gamba et al., 2020). These explainable algorithms may be included as partial explanation of the behavioral model BM.

In an exemplary embodiment, an autonomous vehicle behavioral model system may be treating incoming objects from all directions equally, and the system may be aware that a specific location needs special attention. Hence, an event e may be fired as an input, either by a human during manual review of the system, or by the autonomous system itself. Event e may trigger a feedback action a which may update the respective coefficients or create a rule or partition in the internal state of the underlying model, in order to minimize the gap between the desired behavioral model DBM 300 and the expected behavioral model EBM 320, by tuning the observed behavioral model OBM 350.

A behavioral model BM may incorporate an explainable architecture x, where $x \in \{XAI, XNN, XTT, XRL, XSN, XMN, INN\}$ or logically equivalent or similar architectures. Input constraints may be included during the formal verification of the explainable architecture of such behavioral model $BM_x$. Such input constraints may be based on the internal coefficients of the white-box model or the feature attributions constructed for the input dimensions of observation o.

Feature attributions may identify the importance of a given feature with respect to the result. Hence, explainable architectures may extend the verification process of behavioral modeling by allowing additional constraints to be designed on feature attributions in order to formally verify an exemplary white-box model for potential bias detection in a system.

The output of an exemplary method may include an informative update or a directly actionable output from a sub-module of such system to another sub-module. An informative update may be used to influence sub-components of the behavioral model, which may include the coefficients of the explainable architectures. In an exemplary embodiment, an informative update may be initiated by a system being triggered with additional information, and generating warnings if necessary, thus promoting awareness that a vehicle is approaching with certain explainable feature attributes of such explainable machine learning based architecture. The output may be sent to the motion planning system in order to use information to plan ahead of the motion of the located objects.

The behavioral model BM may construct explanation scaffolding from the output produced by the explainable architecture and use it to illustrate such results to the interpreter to assist in understanding such how the model arrived at such prediction. An interpreter may be the end-user or a sub-component within the behavioral system. The underlying sub-components of a behavioral model BM may require model interpretation in order to update their states or internal parts of an exemplary model. At least three types of model interpretation may be contemplated: basic interpretation, explanatory interpretation, and meta-explanatory interpretation. A basic interpretation may refer to a prediction output o that can be understood by the sub-component. An explanatory interpretation is represented by a 2-tuple vector <o,w> and it refers to a prediction output o combined with a model explanation w for such predicted value, that can be understood by the sub-component.

A model explanation may incorporate coefficients $\theta$ of the explainable architecture x, where $x \in \{XAI, XNN, XTT, XRL, XSN, XMN, INN\}$ or logically equivalent or similar architectures, that may be utilized to explain the feature importance of the input features for a given observation. A meta-explanatory interpretation may be represented by a 3-tuple vector <o,w,j> which may contain the prediction output o, the model explanation w and justification of the model explanation j. The model justification j may provide additional information about the assumptions, processes and decisions taken by the explanation system that were taken into consideration to produce the model explanation.

A behavioral model BM may contain a set of actions a, where $BM_a \in \{a_1, \ldots, a_n\}$, that may perform a change in the status of a sub-component within the model or raise an event e within such model. Actions $BM_a$ may be triggered by a trigger t. A behavioral model BM may contain a set number of triggers $BM_t \in \{t_1 \ldots, t_n\}$. A trigger t may be activated when a condition c set for an exemplary trigger, $t_c$ is set to true. A trigger t may have multiple sets of conditions to be activated, such that $t_c \in \{c_1, \ldots, c_n\}$.

A condition c may be a constraint statement that may be set on the internal coefficients of the explainable architecture x 500, where $x \in \{XAI, XNN, XTT, XRL, XSN, XMN, INN\}$ or logically equivalent or similar architectures, the internal coefficients of the causal model 510, or on any variable within the behavior model BM. The activation of such conditional constraint c, may cause an event e 520 in FIG. 5 and event e 620 or 665 in FIG. 6 to be fired to a particular trigger t 530 in FIGS. 5 and 655 or 630 in FIG. 6, in order to trigger a particular action a 540 or 550 in FIGS. 5 and 640, 650, or 680 in FIG. 6. An event e may trigger additional events within a behavioral model BM, trigger a terminal action $a_t$ 540 in FIGS. 5 and 640 or 680 in FIG. 6, or trigger a feedback action $a_f$ 550 in FIGS. 5 and 650 in FIG. 6. A feedback action $a_f$ 550 in FIGS. 5 and 650 in FIG. 6, may trigger sub-components 660 within a behavioral model BM to perform a particular task, execute an event e in an acyclical manner 690 or execute an event e in a cyclical manner 550, 560 as shown in FIG. 5. A feedback action $a_f$ 550 in FIGS. 5 and 650 in FIG. 6, may be used as behavioral model knowledge injection to update internal parts of an explainable architecture or causal architecture 695 or 670. In an exemplary embodiment, a conditional constraint c may be set on a coefficient in the explainable architecture 1500, as shown in FIG. 15, and upon activation, fires an event e 1510 to activate a trigger t 1520 in order to activate an action a 1530.

An event e may be relayed and processed by a message broker, as shown in FIG. 9. A message broker is an architectural pattern used to exchange messages effectively between components of a behavioral system using asynchronous communication between such components. Events received 910 by the message broker may be normally queued in a queueing system 930 that may be located in the message broker and may utilize a queue data structure, which may operate like a buffer, for the received messages. Exemplary events e may be then processed 920 to the respective sub-components in the behavioral model BM.

A condition c may be set on internal parts of an explainable architecture x, where $x \in \{XAI, XNN, XTT, XRL, XSN, XMN, INN\}$ or logically equivalent or similar architectures, the prediction output of such white-box model, or on variables of other sub-components within BM. A condition c may be based on other conditions in a hierarchical form. A condition may be of the form of conjunctive normal form (CNF), or disjunctive normal form (DNF), or a suitable first order logic in order to be compatible with formal verification problem solvers such as SMT and conflict-driven clause learning (CDCL) SAT solvers.

In a behavioral model BM, a neuro-symbolic conditional constraint c, that is based on the explainable architecture x 500, where x∈{XAI, XNN, XTT, XRL, XSN, XMN, INN} or logically equivalent or similar architectures, may fire an event e, where such event e may also be fired by another conditional constraint on the causal inference architecture 510. Such approach may eliminate redundant identical events from the behavioral model $BM_e$. A trigger t may require multiple events to be received 655 in order for such trigger to be activated. Such approach enables modularity of events $BM_e$, conditional constraints $BM_c$ and triggers $BM_t$ in a behavioral model.

A neuro-symbolic constraint may be implemented in a variety of suitable exemplary implementations including, but not limited to, in the form of symbolic rules or system of symbolic expressions, polynomial expressions, conditional and non-conditional probability distributions, joint probability distributions, state-space and phase-space transforms, integer/real/complex/quaternion/octonion transforms, Fourier transforms, Walsh functions, Haar and non-Haar wavelets, generalized L2 functions, fractal-based transforms, Hadamard transforms, Type 1 and Type 2 fuzzy logic and difference analysis. Neuro-symbolic constraints may also be implemented in form of a data structure that references the different features and variables accessible to the explainable model and any associated taxonomies, ontologies and causal models. Neuro-symbolic constraints may also be implemented in the form of knowledge graph networks.

The triggers of such behavioral model $BM_t$ may link its neuro-symbolic conditions with its previous historic rate of activations in order to constrain the rate of trigger activation. In an exemplary embodiment, a trigger $t_i$ may be based on the fusion of two conditions $c_{n-1}$ and $c_{n-2}$. An additional trigger $t_{i-1}$ may be based on the conditional constraint $c_{n-2}$. Hence when an event is fired to activate trigger $t_i$, trigger $t_{i-1}$ is also activated, as condition $c_{n-2}$ was activated in order to activate trigger $t_i$. Such fusion of conditions may be based on multiple models, within a behavioral model, such as causal model 510 and an explainable architecture x 500, where x∈{XAI, XNN, XTT, XRL, XSN, XMN, INN} or logically equivalent or similar architectures, to trigger an internal action 650 or trigger a terminal action 680.

A behavioral model BM may consists of a safety and assurance component $BM_{sa}$ to monitor the actions of BM that may lead to violations of the safety and assurance of the behavioral model. $BM_{sa}$ may have the ability to modify or terminate the actions to prevent the violations of the safety and assurance of the behavioral model. $BM_{sa}$ may consists of learnable machine learning models x, where x may consist of an explainable architecture, such that x∈{XAI, XNN, XTT, XRL, XSN, XMN, INN} or logically equivalent or similar architectures, as sub-components, enabling $BM_{sa}$ to continue learning patterns of safety violations when the behavioral model is deployed on a system.

Cause-and-effect behavior may be implemented and modelled using a structural causal model (SCM) in order to describe the features of the datasets, being utilized by the model, and the interactions between such features. An SCM may include three components: U, V and f. U may refer to variables that are external to the causal model and are not a descendant of any other variables. Such variables (U variables) are referred to as exogenous variables. V may refer to variables that are a descendant of at least one exogenous variable. V variables are referred to as endogenous variables. The component f refers to the functions that are utilized to derive V variables from the U variables. It is further contemplated that an exemplary BM may be updated based on variables external to the causal model.

A SCM may be associated with a directed acyclic graphical model. A graphical model G may contain N nodes and E edges. The graphical model $G_N$ may contain a node for each exogenous variable in $SCM_u$, where U∈{$U_1, \ldots, U_n$}, and a node for each endogenous variable in $SCM_v$, where V∈{$V_1, \ldots, V_n$}. The edges $G_E$ of the exemplary graphical model may refer to the functions that are used to derive the endogenous variables $SCM_v$. The graphical causal model G may have conditional constraints $G_c$, where C∈{$c_1, \ldots, c_n$}, set on the values of $G_N$, such that if such values exceeds certain threshold h, an event e is fired to activate a trigger t. The trigger t may execute a terminal action or a feedback action to update internal coefficients of a causal model, update internal coefficients of an explainable architecture x, where x∈{XAI, XNN, XTT, XRL, XSN, XMN, INN} or logically equivalent or similar architectures, or update a sub-component within the behavioral model BM.

In an exemplary embodiment, as illustrated in FIG. 13, $SCM_u$={experience$_{school}$, experience$_{work}$} 1340 1350, $SCM_v$={salary} 1360 and $SCM_f$={$f_{salary}$}, where $f_{salary}$: salary=(2*experience$_{school}$)+(3*experience$_{work}$) As shown in FIG. 13, the exogenous variables experience$_{school}$ and, experience$_{work}$ are direct causes of the endogenous salary variable. A conditional constraint may be based on the values of the experience$_{school}$, experience$_{work}$ or salary variables. A conditional constraint may be based on $f_{salary}$, specifically on particular variables within such equation. An exemplary behavioral model BM allows for fusion of conditional constraints in order for the activation of a trigger t, hence multiple conditional constraints may be based on the graphical causal model 510 and on the explainable architecture 500. An event 1300 is fired on the activation of such conditional constraints for a particular trigger 1310 within the behavioral model to execute a terminal action or a feedback action 1320 to update internal coefficients of a causal model 1330, update internal coefficients of an explainable architecture x, where x∈{XAI, XNN, XTT, XRL, XSN, XMN, INN} or logically equivalent or similar architectures, or update a sub-component within the behavioral model BM.

A behavioral model BM may set conditions based on the global feature attributions of the input dimensions of an explainable architecture x, where x∈{XAI, XNN, XTT, XRL, XSN, XMN, INN} or logically equivalent or similar architectures. In a generalized format, let m represent the number of input dimensions (example x, y) and some transform function Transform(X) takes a matrix of m dimensions and returns a matrix with k transformed dimensions (for example, x, y, $x^2$, $y^2$, xy). Let C represent a matrix of coefficients where j represents the total number of rules in the rule-based model, such that:

$$C = \begin{bmatrix} C_{0,0} & \ldots & C_{0,k-1} \\ \vdots & \ddots & \vdots \\ C_{j-1,0} & \ldots & C_{j-1,k-1} \end{bmatrix}$$

The matrix of coefficients may then be aggregated such that the vector I represents the importance of each feature from all j rules such that I={$\theta_0, \ldots, \theta_i, \ldots, \theta_{k-1}$} where $$\theta_i = \sum_{p=0}^{j-1} C_{p,i}.$$

Finally, let $I_s=\{F_0, \ldots, F_s, \ldots, F_{k-1}\}$ represent a sorted vector with all elements of I where s represents the sort index, such that $F_{s-1} \geq F_s \geq F_{s+1}$. A mapper vector M may also be used to link the sorted coefficient index s with the transformed feature index k. A behavioral model BM may create conditions $BM_c$ based on fusion between such matrix coefficients and the input dimensions of the current observation. It is further contemplated that other suitable implementations of I, θ, F and M and/or any other part of the BM may be alternatively implemented to allow for logically suitable extensions such as Type 1 and Type 2 fuzzy logic systems and other suitable logic systems that allow for behavioral modelling and/or specifications. Constraints and expressions underlying conditions, events, triggers and actions may be implemented in a variety of suitable exemplary implementations including, but not limited to, in the form of symbolic rules or system of symbolic expressions, polynomial expressions, conditional and non-conditional probability distributions, joint probability distributions, state-space and phase-space transforms, integer/real/complex/quaternion/octonion transforms, Fourier transforms, Walsh functions, Haar and non-Haar wavelets, generalized L2 functions, fractal-based transforms, Hadamard transforms, Type 1 and Type 2 fuzzy logic, Lambda expressions, constructor-based transforms and difference analysis. Constraints and expressions may also be implemented in form of a data structure that references the different features and variables accessible to the explainable model and any associated taxonomies, ontologies and causal models. Constraints and expressions may also be implemented in the form of knowledge graph networks. Other constraints and expressions may also be implemented on the basis of useful heuristics, such as control charts, Nelson rules, Bode plots, stationary distribution analysis, agglomerative clustering, hierarchical clustering, Nyquist plots and related methods that determine whether some measured behavioral variable is out of control—i.e. giving a measure of unpredictability versus consistency, which may be highly useful in a practical implementation of a BM. In an exemplary embodiment, a combination of induction, deduction, abduction and predictive coding methods may be used to predict and allocate appropriate values to constraints and expressions. In another exemplary embodiment, a formal specification language may be used to specify and create the BM, using a combination of history-based, state-based, transition-based, functional-based and operational-based specification methods using appropriate tools such as contract-based, model-based, content-graph based tools for their implementation.

In an exemplary embodiment, BMs may be used to do constant monitoring of AI models to detect anomalous behavior, detect instances of data drift and OOD instances, analyze and assess the behavior of AI models under OOD and anomalous instances, performance and resource usage monitoring, and other related monitoring activities. BMs may also perform continuous certification of the associated AI model, with an optional confidence/error interval, according to various criteria and raise an action when the certification is in danger of being revoked.

A behavioral model BM may set conditions based on the local feature attributions of the input dimensions of an explainable architecture x, where x∈{XAI, XNN, XTT, XRL, XSN, XMN, INN} or logically equivalent or similar architectures. A specific input sample may have two inputs, in this case x and y for the following exemplary ruleset:

$$f(x, y) = \begin{cases} \text{Sigmoid}(\beta_0 + \beta_1 x + \beta_2 y + \beta_3 xy), & x \leq 10 \\ \text{Sigmoid}(\beta_4 + \beta_5 xy), & x > 10 \land x \leq 20 \\ \text{Sigmoid}(\beta_6 + \beta_7 x^2 + \beta_8 y^2), & x > 20 \land y \leq 15 \\ \text{Sigmoid}(\beta_9 + \beta_{10} y), & x > 20 \land y > 15 \end{cases}$$

A feature importance vector I may represent the feature importance in a local manner such that $I=\{\beta_0, \beta_1, \ldots, \beta_n\}$, where $n=|F|$ which is the total number of transformed features corresponding to the generated features F. In an exemplary embodiment, F may include $\{x, y, xy, x^2, y^2\}$. Given a specific input vector $\{x, y\}$, it may be noted that one or more rules may trigger through the function $f(x, y)$. In this exemplary embodiment, let $x \leq 10$. This may trigger the function $\text{Sigmoid}(\beta_0+\beta_1 x+\beta_2 y+\beta_3 xy)$, which resolves into the following localized feature importance vector $I_L=\{\beta_1 x, \beta_2 y, \beta_3 xy\}$. In an exemplary embodiment, a condition $BM_c$ may be set on such feature importance vector in order to trigger a bias warning to the interpreter of such behavioral model.

The underlying explainable architecture x, where x∈{XAI, XNN, XTT, XRL, XSN, XMN, INN} or logically equivalent or similar architectures, may contain a separate behavioral model $x_{BM}$ that is utilized the training of such model, specifically during the backpropagation phase. Such behavioral model $x_{BM}$ may be distinct from the behavior model BM used on the deployed explainable architecture. Hence, $x_{BM}$ designed for backpropagation mode may include separate conditions, events, triggers and actions.

A behavioral model BM may contain multiple explainable architectures $BM_x$, such that $BM_x \in \{x_1 \ldots x_n\}$. Such architectures $BM_x$ may share conditions c, triggers t, actions a and events e. In such case, there might exist some conditions, triggers, actions and events in $x1_c$, $x1_t$, $x1_a$, $x1_e$ respectively and $x2_c$, $x2_t$, $x2_a$, $x2_e$ respectively, that are identical as defined in Equation 5, Equation 6, Equation 7 and Equation 8.

$$(x1, x2) \in BM_x, \exists k \in x1_c, \exists u \in x2_c: \text{identical}(k, u) \quad (5)$$

$$(x1, x2) \in BM_x, \exists k \in x1_t, \exists u \in x2_t: \text{identical}(k, u) \quad (6)$$

$$(x1, x2) \in BM_x, \exists k \in x1_a, \exists u \in x2_a: \text{identical}(k, u) \quad (7)$$

$$(x1, x2) \in BM_x, \exists k \in x1_e, \exists u \in x2_e: \text{identical}(k, u) \quad (8)$$

A behavioral model BM may contain multiple explainable architectures $BM_x$, such that $BM_x \in \{x_1, \ldots, x_n\}$, and the output from a neuron node in an explainable architecture may be used to update a weight in another explainable architecture. An explainable architecture that makes use of weights that are updated using such approach is known as a fast explainable architecture f, where f∈{F–XAI, F–XNN, F–INN, F–XTT, F–XRL}. A condition c in a behavioral model BM may be based on a fusion constraint of the weights and the output of a node, of a fast, explainable architecture. A condition c in a behavioral model BM may be based on a fusion of constraints that incorporate a weight from a fast explainable architecture and a prediction output or a coefficient from an internal part from a normal explainable architecture. A condition c in a behavioral model BM may be based solely on a fast weight in a fast, explainable architecture.

FIG. 7 illustrates an exemplary partial XNN architecture. In an exemplary embodiment, a behavioral model BM may incorporate an XNN explainable architecture $x_i$ 700 and a fast XNN explainable architecture $x_{i+1}$ 710. The $x_i$ 700 prediction output layer of the prediction network may be connected to a particular coefficient 720 of the prediction network of a fast XNN architecture $x_{i+1}$ 710. Fast XNN architectures utilize a fast connection (Schmidhuber, 1991) to adapt faster to changing input data by changing the weights of another XNN entirely during feed-forward operation, or part of the same XNN, without having to use slower learning methods, such as those necessitated by gradient descent methods, or those that need back-propagation or other similar types of slower updates. Fast XNNs can solve vanishing gradient problems while maintaining explainability. The combination of BMs with Fast XNNs allows for such highly adaptive systems to have predictable and controllable behavior. It is further contemplated that a Fast XNN may rapidly change fast weights during operation, in proportion to the current activations of the corresponding units in the start and end points (which are known as FROM-TO in the original fast neural network literature, and KEY-VALUE in Transformers and XTTs). In an exemplary embodiment, BM conditions and constraints, events, and triggers may be implemented using Fast XNN connections. In another exemplary embodiment, a BM may have conditional constraints, events and triggers based directly or indirectly on output transmitted and received from an underlying Fast XNN architecture. In another exemplary embodiment, a BM may utilize Fast XNN connections to connect to a non-Fast XNN, where the weights simply copy and transmit the weights of the associated weights of the edges or nodes within the non-Fast XNN, without disrupting or affecting the non-Fast XNN behavior.

A distributed explainable architecture DEA may be utilized in a behavioral model framework in order to increase the performance of the defined models, as illustrated in FIG. 10. A distributed explainable architecture DEA may contain multiple explainable architectures $DEA_m$, that may be processed in parallel, such that $m \in \{x_1, x_2, \ldots, x_n\}$ where $x \in \{XAI, XNN, XTT, XRL, XSN, XMN, INN\}$. The number of explainable architectures 1010 in an exemplary distributed framework is defined as $DEA_n$, where $DEA_n$ is the length of m.

Distributed explainable architecture DEA splits the dataset into multiple subsets 1000 of data in order to train the explainable architectures $DEA_m$. The models trained in such distributed framework DEA may be aggregated 1020 during the training phase by calculating the average (or weighted average) from the parallel models. The aggregate model may be formed based directly on the weights of the model, rather than from the result of the individual models. A distributed explainable architecture DEA may be useful for large datasets where the training data cannot fit in the CPU/GPU memory of a single machine.

A distributed explainable architecture DEA may incorporate hybrid models, such that the models in an exemplary architecture are a mix of x, where $x \in \{XAI, XNN, XTT, XRL, XSN, XMN, INN\}$. An exemplary embodiment may implement multiple different models. For example, one data part may implement an XNN while another data part of the same system may implement an XAI. The models may then be combined to create an aggregate model. The aggregate model may be equal to x, where $x \in \{XAI, XNN, XTT, XRL, XSN, XMN, INN\}$, or may be a hybrid model implementing multiple different models. A distributed explainable architecture DEA may incorporate multiple independent models where one such model, once trained, can work independently without the need to rely on the full distributed architecture, which is optimized primarily for training purposes.

Conditional constraints may be set on the internal coefficients of the explainable architecture x in a distributed explainable architecture DEA. As illustrated in FIG. 11, a conditional constraint c may be set on a coefficient that is located in a specific model in $DEA_m$ 1110 in FIG. 11 or 1210 in FIG. 12, having the input data 1100 in FIG. 11, or 1200 in FIG. 12. The activation of the conditional constraint, leads to an event e 1150 being fired in order to trigger 1160 an action a 1170 to produce the respective output 1180. The action a may perform a change in the status of a sub-component within the model or raise an event e within the model. The actions $BM_a$ may be triggered by a trigger t. A behavioral model BM may contain a set number of triggers $BM_t \in \{t_1 \ldots t_n\}$. A trigger t is activated when a condition c set for such trigger, $t_c$ is set to true. A trigger t may have multiple set of conditions to be activated, such that $t_c \in \{c_1, \ldots, c_n\}$.

In an exemplary embodiment, a distributed explainable architecture DEA has n explainable models. Hence $DEA_m$, such that $m \in \{x_1, x_2, \ldots, x_n\}$ and $x \in \{XAI, XNN, XTT, XRL, XSN, XMN, INN\}$. $x_1$ may have an action a 1270 that is based on an internal trigger $x_{1\_t\_1}$ that is activated when the fusion of two conditional constraints 1252 $x_{1\_c\_1}$ and $x_{1\_c\_2}$ are set to true. $x_{1\_t}$ may refer to the triggers defined for the explainable model $x_1$, where $t \in \{t_1, \ldots, t_n\}$. Trigger $x_{1\_t\_2}$ may be based on a partial constraint 1260 of trigger $x_{1\_t\_1}$, and the constraint being $x_{1\_c\_1}$. Hence, when the conditional constraint $x_{1\_c\_1}$ and $x_{1\_c\_2}$ are set to true, an event is fired to activate trigger $x_{1\_t\_1}$, however an additional event is fired to activate $x_{1\_t\_2}$. The fusion of conditional constraints may be based on multiple models m, within a distributed explainable architecture DEA to trigger the desired actions 1270 and 1280.

A Behavior Model Hierarchy (BMH) is a hierarchical framework that may incorporate two or more behavioral models. Such behavioral models within a BMH may be connected to each other or connected to a single or multiple explainable systems.

A Behavior Model Hierarchy (BMH) may be used to maintain scalability and create re-usable components, as shown in FIG. 8. BMH may include super-states $BMH_s$ that communicate between its behavioral models $BMH_{BM}$ 820, 830 and generalized transitions 840 to transition between such behavioral models $BMH_{BM}$. Super-states $BMH_s$ are a group of states that are utilized to prevent redundant transitions between normal states. Such transitions between super-states $BMH_s$ are referred to generalized transitions. BMH may utilize attributions and information, that is retrieved from internal states of such explainable architectures 800 or from the output of the computation from such explainable architectures, to update the state of a super-state. An exemplary output may include any related meta information of the explainable architectures. A Behavior Model Hierarchy BMH may also combine events e 810, actions a, and triggers t from multiple behavioral models $BMH_{BM}$ in order to achieve a certain objective. 850 may refer to the output, actions a, events e and triggers t activated from the behavioral model $BM_{k+1}$ 830. A Behavior Model Hierarchy BMH may be defined as an acyclic BMH or a cyclical BMH. A cyclical BMH may refer to a BMH which includes feedback actions $a_{feedback}$ from a behavioral model BM to another behavioral model BM within such Behavior Model Hierarchy BMH. An acyclic BMH may refer to a BMH that does not contain feedback action loops between behavioral models $BMH_{BM}$.

FIG. 17 illustrates the path trace of an observed behavioral model (OBM). An OBM may contain a mix of frequently executed paths, like path 1790, and paths that are executed only occasionally, like path 1780. A BM may contain the predicted boundaries of the model associated with the BM 1705. An OBM may contain actual boundaries of the model associated with the BM 1740. It is contemplated that OBM actual boundary information 1740 may be utilized to update the BM predicted boundaries 1705. It is further contemplated that OBM actual boundary information 1740 may be utilized to update EBM predicted boundaries. The predicted boundaries may refer to, but not limited to, a sub-component output of an explainable architecture x, where x∈{XAI, XNN, XTT, XRL, XSN, XMN, INN} or similar logically equivalent architectures. The predicted boundaries may also refer to a suitable transformation in an appropriate input-output space, logically equivalent, topologically equivalent or phase-space equivalent space based on the output of an AI model associated with the BM. An OBM may identify non-optimal areas 1700 due to uncertainty in the associated model behavior. The identification and eventual assessment of these non-optimal areas 1700 may be optimized by fine-tuning the predicted model boundaries 1705. A narrow gap between the predicted model boundary 1705 and the actual model boundary 1740 may indicate good understanding and good fit of the BM. A BM may also potentially cover future predicted operational spaces and behavior for the associated model for transactions and data that have not been observed yet 1710. Such not-yet-observed areas are also referred to as Out-Of-Distribution (OOD) areas and are the focus of problems related to Zero-Shot, One-Shot and Few-Shot Learning. BMs may aid in the development of such systems by aiding in the identification of potential behavior that has not yet been encountered or observed during actual operation of the associated model. A BM may also contain underspecified areas due to lack of model coverage 1720. Neuro-symbolic symbols may help assure safety in underspecified areas, by setting neuro-symbolic conditional constraints on the boundary of the global model 1740. Weakness in the dataset 1750 may result in a limited amount of information available, from the model path traces, or other forms of associated model information, in the construction of the BM predicted model boundaries 1705, leading to incomplete coverage. The BM may also contain areas that correspond to dangerous or disallowed areas 1760. Neuro-symbolic symbols may assure the safety in dangerous or disallowed areas 1760 by creating neuro-symbolic constraints on the predicted boundaries 1705. The impact of each node in the behavioral model, as exemplified in FIG. 17, may be calculated as the cumulative combination of the multiple criteria measures that are applicable to the respective node and its successor nodes (i.e. all possible child node path until the leaf nodes), of the behavioral model. This impact can be calculated for both tree, graph and hypergraph structures, enabling BMs to be applicable to both standard, graph and hypergraph explainable models, including XNNs with n-ary tree like partition hierarchies, XNNs with graph-like partition hierarchies and XNNs with hypergraph-like partition hierarchies. The combination of multiple criteria measures is based on the objective of the behavioral model. In an exemplary embodiment, a behavioral model may have multiple criteria measures based on model performance, bias reduction, and risk management. The combination of multiple criteria measures may be normalized by expressing the total paths from the root as 1 and the rest of the paths as a fraction of the total score bounded between [0 . . . 1]. It is contemplated that a node discovery process in a behavioral model may use game theory to discover the optimal nodes for the selected combination of criteria measures. It is further contemplated that alternative methods such as Multiple Objective Optimization (MOO), Pareto Front Methods, Particle Swarm Optimization (PSO), Genetic Algorithms (GA), Bayesian Optimization, Evolutionary Strategies, Gradient Descent techniques and Monte Carlo Simulation (MCS) may be used to discover optimal nodes for a given desired combination of criteria measures.

In an exemplary embodiment, an autonomous system may be designed using Behavior Model Hierarchy BMH. A BMH may include multiple behavioral models $BMH_{BM}$, where $BMH_{BM} \in \{BM_k, \ldots, BM_n\}$. An exemplary BMH may include a machine learning model x, where x∈{XAI, XNN, XTT, XRL, XSN, XMN, INN}, or logically equivalent or similar architectures, 500 that is utilized by multiple behavioral models 820, 830. An exemplary autonomous system may have conditional constraints $BMH_c$ on the white-box machine learning model 500. The activation of such conditions $BMH_c$ may fire events $BMH_e$ to triggers $BMH_t$ that may be connected in multiple behavioral models 820, 830 $BM_K$ and $BM_{k+1}$. The triggers $BMH_t$ may provide feedback actions $BMH_{af}$ to the machine learning model 500 or terminal actions in such behavioral model $BMH_{at}$. Such autonomous system Behavior Model Hierarchy BMH may include multiple machine learning models $BMH_x$, where $BMH_x \in \{x_1, \ldots, x_n\}$. In such case, conditions of such Behavior Model Hierarchy BMH may be fused together as a conditional requirement for a particular trigger in $BMH_t$.

A behavioral model BM or Behavior Model Hierarchy BMH may be required to be verified against a specification of the desired behavior before being deployed in a system, in order to assure the safety of the system. A model that achieves a high accuracy might not be formally verified, since accuracy may not illustrate how much of the internal logic was tested when validating the model on the unseen dataset. The verification is critical in order to verify the output of a model under specific conditions, in order to avoid costly mistakes such as when implemented in life or death situations, as may occur in, for example, autonomous vehicles. In an exemplary embodiment, an autonomous vehicle system must be verified such that an output action for certain conditions must always be the same in order to avoid fatal accidents. Hence, a behavioral model or Behavior Model Hierarchy BMH may need to be formally verified for particular linear, non-linear and/or convex-relaxable (Qin et al., 2019) specifications to ensure the decision of the model when the respective model is deployed, using the appropriate verification algorithms.

It may be contemplated that a behavioral model BM or hierarchy BMH may be implemented and verified by on a combination of systems based on one or more of the Temporal Logic of Actions, Abstract Machine Notation, Computation Tree Logic and other suitable implementation methods that can fort ally represent modal logics, intuitionistic logics, and/or relational semantics, including but not limited to Kripke semantics and/or Alexandrov topologies.

A behavioral model BM that incorporates a deep learning model may be formally verified using techniques such as Reluplex (Katz et al., 2017) or suitable technique, to verify the model for particular conditions on the input dataset and the output value, in order to know that such conditions are satisfiable for such model. Conditions c for black-box models may include constraints on the input dimensions and the output dimension of such model.

In an exemplary embodiment, a BM may be used to implement formal verification of an autonomous system to detect nearby pedestrians may be described using constraints and/or rules such as "if a pedestrian is near the autonomous system; and such pedestrian is coming from the left, perform a right turn". An automated constraint and/or rule augmentation system may augment the verification statement by additional background rules adopted from the world context, for example, by adding "where such turn is determined by the system speed, predicted pedestrian speed and right hand obstacle boundaries". Such a verification problem can be converted into a solvable system of equations, with parameters such as the distance between the autonomous system and the pedestrian, D, given $dist_l < D < dist_u$, where $dist_l$ and $dist_u$ are the lower and upper boundaries of such distance, and at angle θ, given $ang_l < θ < ang_u$, where $ang_l$ and $ang_u$ are the lower and upper boundaries of the angle of the predicted pedestrian movement vector. Formal verification techniques may be utilized to verify that with such parameter constraints, the prediction output for the right turn angle needs to be within boundaries $l_{lower} < right_{turn} < o_{upper}$. Furthering the example, such formal verification solutions may also be implemented in parallel with those based on observational, dynamic verification of actual observed behavior, in this case, running on the autonomous system itself. Continuing with the example, the autonomous system may also output an explanation at a user-level like "Had to swerve strongly to the right to avoid the pedestrian who ran in front of the car". Adjectives in the explanation, such as "strongly" can be determined via some appropriate classification method, value lookup table, fuzzy logic system, AI model or other appropriate text generation implementation. The autonomous system may also output more detailed explanations, for example, at a diagnostic-level like "Car swerved strongly to the right (acceleration profile: angle=20°, speed delta=2.77 m/s) to avoid pedestrian (detected object: class=pedestrian, confidence=95%; object vector (predicted): relative degree=90°, relative speed delta=2.22 m/s) collision (predicted collision=91%; predicted injury risk=HIGH; predicted vehicle component=front headlamp)". The autonomous system may also utilize the diagnostic-level explanation, encoded in a suitable format, such as a machine-readable method for encoding and transmitting XAI knowledge, to produce multimedia output, such as an animation on a suitable dashboard display or heads up display system or augmented reality display. It is further contemplated that such information may also be transmitted over an appropriate Intelligent Transport System (ITS) network, such as a vehicle to vehicle (V2V) network, vehicular ad hoc network (VANET), mobile ad hoc network (MANET) using an appropriate inter-vehicle communications (IVC) protocol such as an IEEE 802.11p compatible protocol.

A behavioral model BM play include an explainable architecture $BM_x$, where $x \in \{XNN, XTT, XRL, XSN, XMN, INN\}$ or logically equivalent or similar architectures. An exemplary embodiment enables formal verification constraints to be set on the output or internal parts of such explainable architecture $BM_x$. The output may include feature attributions for the input dimensions of the observation and partition information for such observation. Internal parts of such explainable architecture $BM_x$ may include coefficients of the local model for such observation.

The execution sequence es of the behavioral model BM may refer to the execution trace routed by the behavioral model transition function between the defined components of such model. An execution sequence is unique if the behavioral model BM is a deterministic model. An execution sequence is not unique if the behavioral model BM is a non-deterministic model.

In the exemplary case of non-deterministic behavioral model, the sequence is not unique, when the same input is used for such behavioral model, multiple execution traces are generated. Let input dimensions be defined as input_d, hence, in a non-deterministic behavioral model $es_{input\_d} = \{es_1, \ldots, es_n\}$. An exemplary method enables conditions $BM_c$ to be set on the execution sequences $es_{input\_d}$, such that events $BM_e$ are fired to trigger an action a if such conditions $BM_c$ are true. In an exemplary embodiment, a system may rank the execution sequences $es_{input\_d}$ for the same input dimensions, according to the probability likelihood of encountering such an execution sequence in the model.

An exemplary behavioral model may store the probability likelihood information for its respective execution sequences es, where SU sequences are known as probabilistic execution sequences. A behavioral specification of an exemplary behavioral model BM may include a set of initial states and the respective execution traces. A behavioral specification may have complete coverage of all possible execution traces or partial coverage if it does not include all possible execution traces.

In an exemplary embodiment, behavioral model $BM_1$ has the behavioral specification $SBM_1$ and behavioral model $BM_2$ has the behavioral specification $SBM_2$. The difference between the execution traces of $BM_1$ and $BM_2$ is defined as $\xi(SBM_1, SBM_2)$. The difference $\xi(SBM_1, SBM_2)$ may include execution sequences es, where $es = \{es_1, \ldots, es_n\}$, that are not identical in $SBM_1$ and $SBM_2$.

The difference $\xi(SBM_1, SBM_2)$ between the behavioral specification $SBM_1$ of a probabilistic behavioral model $BM_1$ and the behavioral specification $SBM_2$ of non-probabilistic behavioral model $BM_2$ may be computed by discarding the probabilistic information of $BM_1$ and comparing the execution sequences es without using the probabilistic information.

The difference between the behavioral specification $SBM_1$ of a probabilistic behavioral model $BM_1$ and the behavioral specification $SBM_2$ of probabilistic behavioral model $BM_2$ is defined as $\xi_p(SBM_1, SBM_2)$ The difference $\xi_p(SBM_1, SBM_2)$ may include the probabilistic information of the execution sequences es, where $es = \{es_1, \ldots es_n\}$. The difference $\xi_p(SBM_1, SBM_2)$ may be calculated using a suitable difference method such as subtraction between the probability likelihoods of such execution sequences es.

An exemplary embodiment may enable conditions of a behavioral model hierarchy $BMH_c$ to contain constraints on the difference between the behavioral specification $SBM_1$ of behavioral del $BM_1$ and the behavioral specification $SBM_2$ of behavioral model $BM_2$. In an exemplary embodiment, the behavioral model hierarchy conditions $BMH_c$ may be based on a threshold th, where threshold th may refer to the probability likelihood difference between such execution sequences es.

In an exemplary embodiment, an autonomous vehicle system is based on a behavioral model hierarchy BMH. This exemplary behavioral model hierarchy BMH may include behavioral models $BMH_{BM} \in \{BM_1, \ldots, BM_n\}$. The system may include conditional constraints $BMH_c$ such that the difference $\xi_p(SEBM_1, SOBM_1)$ between the behavioral specification of the expected behavioral model $EBM_1$ and the behavioral specification of the observed behavioral model $OBM_1$ may be used to monitor for deviations between the expected behavioral model $EBM_1$ and the empirical observations in such execution sequences es of the observed behavioral model $OBM_1$.

An exemplary embodiment of the behavioral specifications may further utilize constraint satisfaction methods, concurrent and distributed system specification methods, temporal logics, and/or other relevant implementation and embodiment methods to achieve the specification and subsequent verification functionality. It may be further contemplated that possible embodiments may be based on a combination of systems based on the Temporal Logic of Actions, Abstract Machine Notation, Computation Tree Logic and other suitable implementation methods.

An exemplary embodiment of a BM or BMH can be implemented using a distributed, scalable system involving a mix of virtual zed hardware (such as that hosted on a cloud processing platform or similar data centre oriented solution), physical dedicated hardware hosted in a purpose-built location, sensored and sensorless hardware, closed-loop and open-loop engineered systems, edge hardware and IoT devices that are mobile or installed in various disparate locations often with vary degrees of connectivity including situations where there is minimal or no connectivity to a centralized system for long periods of time.

In another exemplary embodiment, a BM may be implemented using neuromorphic hardware. The conditions, events, triggers and actions of a BM may also run entirely natively on appropriate neuromorphic hardware. Explainable models, such as XNNs, that can also run natively on neuromorphic architectures can be seamlessly associated and linked with a BM entirely on neuromorphic hardware. Such an exemplary embodiment may provide a practical solution for behavioral monitoring, assessment, identification, prediction and control of neuromorphic devices in a controlled, reliable, and replicable manner.

In another exemplary embodiment, a BM may be implemented using a quantum processing system. It is contemplated that an BM implemented on a quantum processing system will have characteristics that are similar to classical BM models with the addition of quantum specific extensions. For example, such an extension may allow for the specification of quantum annealing effects and their correct interpretation. In another example, an extension may allow for the correct interpretation of multiple qubit states, qubit basis states, mixed states, Ancilla bits, and other relevant quantum effects due to entanglement and/or decoherence. In another example, an extension may allow for the introduction of quantum logic specific operators and/or hardware logic gates within an XNN, such as quantum CNOT, CSWAP, XX, YY, ZZ gates, Pauli gates, Hadamard gates, Toffoli gates and other relevant quantum logic operations that may be combined serially or in parallel. Furthering these examples, such quantum specific extensions may be implemented in various parts of the BM system, for example by having quantum extended versions of conditions, events, triggers and actions. It is further contemplated that such quantum extended versions of a BM may take advantage of quantum effects, for example, to execute multiple actions, or evaluate multiple conditions, or evaluate large systems of constraints in significantly fewer processing steps needed than possible on a classic processing implementation. Quantum Causal BMs, such as a quantum extension of the exemplary system illustrated in FIG. 18, can model quantum decoherence effects and the inherent uncertainties involved in quantum measurement via the {AU 1804→FU 1806}, {AU 1804→XU 1805→FU 1806}, {AK 1814→XK 1815→FK 1816}, {AK 1814→FK 1816}, and {AU 1804→XK 1815→FK 1816} paths. In such a Quantum BM, there may be multiple outcomes instead of a single outcome for a Classical BM. Similarly, a Quantum EBM may have multiple expected outcomes instead of single outcomes in a Classical EBM. In a Quantum BM, the OBM represents the measurement, and hence collapse of quantum states, and will thus represent similar information to a Classical OBM, although the actual results may be different due to the use of quantum logic operations. A Quantum BM thus represents a practical way of monitoring, identifying, assessing, predicting and controlling the behaviour of a quantum AI model running on quantum computing device.

It another exemplary embodiment, a BM may be used in conjunction with AI models that may process sequence data. Sequence data may include a number of data points which contain feature data in various sequential formats including, but not limited to: 2D data, 3D data, transactional data, sensor data, image data, hyper-spectral data, natural language text, video data, audio data, haptic data, LIDAR data, RADAR data, SONAR data, and the like. Data points may have one or more associated labels which may indicate the output value or classification for a specific data point or a continuous or non-continuous interval of data points. Data point sequences may result from an internal and/or external process that may output a combination of synthetic data points, perturbed data, sampled data, or transformed data. Such data point sequences may be the input for BM constraint expressions, conditions, events, triggers and actions.

In another exemplary embodiment, a BM may be integrated with a Robotic Process Automation (RPA) system with a bi-directional exchange of information between the BM system and the RPA system. Symbolic information within the BM system may be made accessible to the RPA system, which can then take automated action accordingly. Conversely, RPA system information or operational states may be made accessible to the BM system for control and configuration purposes. It may be further contemplated that alternative exemplary embodiments can be practically implemented, where the RPA system may be substituted with a suitable alternative, such as an action-trigger system or a real-time control system. BM actions may also be directly implemented as RPA system actions.

In another exemplary embodiment, a BM may be integrated with a workflow system with a bi-directional exchange of information between the BM and the workflow system. Symbolic information within the BM system may be made accessible to the workflow system, which can then take automated action accordingly. Conversely, workflow system information and workflow transition states or operational states may be made accessible to the BM system for control and configuration purposes.

In an exemplary embodiment, a BM may be implemented as part of an Explanation and Interpretation Generation System (EIGS) that utilizes the BM in the creation of answers, explanations, justifications, and interpretations within a personalized goal-plan-action architecture. It is further contemplated that a sequence of Explanation and/or Interpretation predictions and/or a sequence of Explanation and/or Interpretation representations may be used by the EIGS to analyze the flow of the Explanation and/or Interpretation values and features over time. Such flow may be used by the BM as part of its conditions, events, triggers and actions to increase the range of behaviors to be monitored and optionally acted upon.

In an exemplary embodiment, a causal model may include one or more of: Pearl's structural causal models that are associated derivations and variations, dynamic causal models associated with Bayesian model comparison methods and variations, Granger causal models, Wiener causal models, Rubin causal models, Spirtes, Glymour, Scheines causal models, non-linear state-space methods, convergent cross mapping (CCM), lagged correlations, Peter and Clark (PC) methods, linear non-gaussian acyclic model (LiNGAM) methods, Fast Causal Inference (FCI) methods, relativistic causal models arising from special and general relativity, and machine learning models that are representative of cause-and-effect.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A computer implemented behavioral modeling method for handling, modeling, predicting, and verifying a behavior of a system comprising at least one of neural network, explainable artificial intelligence model, or machine learning algorithm, comprising executing on a processor the steps of:
    integrating conditions into an activation sequence of a behavioral modeling architecture to monitor a plurality of probability likelihoods of a plurality of potential activation paths;
    identifying one or more explanations corresponding to at least one state from a state space or at least one reward, identifying a plurality of actions from an action space, and simultaneously associating at least one action and an explanation of the associated action(s) with the at least one state or reward, wherein at least one of the state space and the action space is discrete or continuous;
    predict and store a predefined predicted boundary of the system;
    monitoring the integrated conditions during training and prediction of the system, wherein, during the monitoring, if one or more of the integrated conditions are met, the method proceeds by triggering a system-knowledge injection, wherein the system-knowledge injection is configured to maintain the behavior of the system within a predefined actual boundary;
    identifying a gap between the predefined predicted boundary of the system and the predefined actual boundary of the system, and determining that the gap is an under-specified gap in a case where the predefined predicted boundary of the system extends outside of the predefined actual boundary and determining that the gap is a non-optimal gap in a case where the predefined predicted boundary of the system is inside of the predefined actual boundary; and
    tuning the behavioral modeling architecture, wherein tuning the behavioral modeling architecture comprises updating the predefined predicted boundary based on information observed during the monitoring, and terminating tuning upon determination that the gap between the predefined predicted boundary of the system and the predefined actual boundary of the system is reduced;
    wherein the behavioral modeling architecture is updated according to one or more actions of the system or based on information retrieved from an external behavior modeling architecture.

2. The computer implemented behavioral modeling method of claim 1, further comprising verifying a plurality of constraints to be set on one or more of an output or an internal part of the system.

3. The computer implemented behavioral modeling method of claim 2, wherein the system is an explainable artificial intelligence model, and the constraints are on one or more of a prediction network or a conditional network of the system.

4. The computer implemented behavioral modeling method of claim 1, wherein the conditions are based on information retrieved from one or more internal states or outputs of the system, and wherein a variance or a deviation of the behavior of the system from the predefined predicted boundary provides for one or more additional conditions or one or more additional boundaries.

5. The computer implemented behavioral modeling method of claim 1, wherein the action and state form at least one state-action pair, wherein each state and action of each state-action pair have a constant connection point.

6. The computer implemented behavioral modeling method of claim 1, further comprising labeling one or more components within the system with one or more reference labels, wherein each reference label indicates an activation path leading to the labeled component.

7. The computer implemented behavioral modeling method of claim 6, wherein each reference label comprises one or more of: symbolic expressions provided in one of conjunctive normal form, disjunctive normal form, or first order logic, polynomial expressions, conditional and non-conditional probability distributions, joint probability distributions, state-space and phase-space transforms, integer/real/complex/quaternion/octonion transforms, Fourier transforms, Walsh functions, Haar and non-Haar wavelets, generalized L2 functions, fractal-based transforms, Hadamard transforms, Type 1 and Type 2 fuzzy logic, Lambda expressions, constructor-based transforms and difference analysis and formulas provided in one of conjunctive normal form, disjunctive normal form, or first order logic, and wherein the constraints are implemented as one or more of: control charts, Nelson rules, Bode plots, stationary distribution analysis, agglomerative clustering, hierarchical clustering, and Nyquist plots; and
    wherein the method further comprises:
        predicting and allocating appropriate values to constraints and conditions using one or more of induction, deduction, abduction and predictive coding methods, and
        specifying and creating the behavioral modeling architecture using a formal specification language, using a combination of history-based, state-based, transition-based, functional-based and operational-based specification methods and using one or more contract-based, model-based, and content-graph based tools.

8. The computer implemented behavioral modeling method of claim 6, further comprising outputting one or more explanations based on one or more reference labels, wherein the one or more reference labels comprise an interpretable path trace for one or more components associated with the reference labels.

9. The computer implemented behavioral modeling method of claim 6, wherein the one or more components comprise at least one of a node or a connection between one or more nodes.

10. The computer implemented behavioral modeling method of claim 1, further comprising logging a plurality of decisions and a plurality of path traces in an audit log, wherein the audit log comprises a system of record or a distributed ledger system.

11. The computer implemented behavioral modeling method of claim 1, wherein the system is implemented on at least one of: a robot, a transport or vehicle system, a medical technology system or device, a communication system, an operational system, a surveillance or monitoring system, and an autonomous system; and
wherein the method further comprises generating explanations corresponding to one or more states or one or more actions of the system.

12. The computer implemented behavioral modeling method of claim 1, further comprising converting an input of the system to a set of hidden features, identifying feature weights from the hidden features, combining the feature weights with the transformed input, extracting an attribution of each hidden feature based on the combined feature weights and hidden features.

13. The computer implemented behavioral modeling method of claim 12, wherein the feature weights are identified using a relevance estimator, and wherein the input comprises a plurality of data points associated with one or more of: sequence data, temporal data, 2D data, 3D data, transactional data, sensor data, image data, hyper-spectral data, natural language text data, video data, audio data, haptic data, LIDAR data, RADAR data, SONAR data, synthetic data, perturbed data, sampled data, and transformed data.

14. The computer implemented behavioral modeling method of claim 13, further comprising aggregating a plurality of feature attributions and outputting the aggregated feature attributions.

15. The computer implemented behavioral modeling method of claim 12, wherein the extracted attribution is linked directly to the input of the system.

16. The computer implemented behavioral modeling method of claim 1, further comprising creating a plurality of partitions within the system, wherein each partition is associated with a label, a graph, a hypergraph, or a simplicial complex; and
a plurality of neuro-symbolic constraints associated with the partitions, wherein the neural-symbolic constraints associated with the partitions can be converted to a machine-readable language or human-readable text.

17. The computer implemented behavioral modeling method of claim 1, wherein each partition comprises a local model with one or more rules, and the partitions are aggregated to form a global model.

18. The computer implemented behavioral modeling method of claim 1, wherein the behavioral modeling architecture is implemented on one or more Finite State Machines, Petri Nets, Robotic Process Automation (RPA) systems, Actor Models, middleware systems, control process systems, neuro-symbolic systems, workflow systems, quantum processing systems.

19. The computer implemented behavioral modeling method of claim 1, further comprising verifying the computer implemented behavioral modeling method using an external explainable model, wherein the explainable model comprises one or more constraints that are set on an output or one or more internal parts of the explainable model to validate the behavior of the system.

20. The computer implemented behavioral modeling method of claim 1, wherein the conditions are based on model performance, bias reduction, and risk management.

21. The computer implemented behavioral modeling method of claim 1, further comprising monitoring a safety of the system based on a behavioral specification of the behavioral modeling architecture when the behavioral modeling architecture is monitoring the integrated conditions.

22. The computer implemented behavioral modeling method of claim 1, further comprising:
implementing a causal model configured to handle said one or more machine learning models in relation to the system, wherein the causal model is separate from the system or becomes a part of an explainable system for providing at least one of: one or more triggers, one or more events, and one or more actions.

23. The computer implemented behavioral modeling method of claim 22, wherein the at least one of the one or more triggers, the one or more events, and the one or more actions correspond to the conditions integrated into the behavioral modeling architecture.

24. The computer implemented behavioral modeling method of claim 22, wherein the causal model comprises one or more of: Pearl's structural causal models that are associated derivations and variations, dynamic causal models associated with Bayesian model comparison methods and variations, Granger causal models, Wiener causal models, Rubin causal models, Spirtes, Glymour, Scheines causal models, non-linear state-space methods, convergent cross mapping (CCM), lagged correlations, Peter and Clark (PC) methods, linear non-gaussian acyclic model (LiNGAM) methods, Fast Causal Inference (FCI) methods, relativistic causal models arising from special and general relativity, and machine learning models that are representative of cause-and-effect.

25. The computer implemented behavioral modeling method of claim 1, wherein the behavioral modeling architecture receives one or more knowledge injections, wherein the received knowledge injections update or retroactively update the behavioral modeling architecture based on an explainable system comprising explainable and causal architectures.

26. The computer implemented behavioral modeling method of claim 1, further comprising linking the behavioral modeling architecture to an external system to provide human understandable explanations based on the behavioral model, wherein said architecture is a part of or is connected to an external diagnostic or detection system for model interpretations, and wherein the behavioral modeling architecture is implemented as a part of an Explanation and Interpretation Generation System.

* * * * *